United States Patent
Liu et al.

(10) Patent No.: US 10,340,833 B2
(45) Date of Patent: Jul. 2, 2019

(54) LOAD DRIVE DEVICE

(71) Applicant: HITACHI AUTOMOTIVE SYSTEMS, LTD., Ibaraki (JP)

(72) Inventors: Ming Liu, Tokyo (JP); Taizo Yamawaki, Tokyo (JP); Takuya Mayuzumi, Ibaraki (JP); Ryosuke Ishida, Ibaraki (JP); Yasushi Sugiyama, Ibaraki (JP); Goichi Ono, Tokyo (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 5 days.

(21) Appl. No.: 15/580,957

(22) PCT Filed: Apr. 12, 2016

(86) PCT No.: PCT/JP2016/061777
§ 371 (c)(1),
(2) Date: Dec. 8, 2017

(87) PCT Pub. No.: WO2016/199491
PCT Pub. Date: Dec. 15, 2016

(65) Prior Publication Data
US 2018/0183375 A1 Jun. 28, 2018

(30) Foreign Application Priority Data
Jun. 9, 2015 (JP) .................. 2015-116206

(51) Int. Cl.
*H02P 27/06* (2006.01)
*H02P 29/024* (2016.01)
*H02P 3/22* (2006.01)

(52) U.S. Cl.
CPC ............... *H02P 27/06* (2013.01); *H02P 3/22* (2013.01); *H02P 29/027* (2013.01)

(58) Field of Classification Search
CPC .......... H02P 27/06; H02P 29/027; H02P 3/22
See application file for complete search history.

(56) References Cited

U.S. PATENT DOCUMENTS

2003/0042859 A1  3/2003  Gorti et al.
2009/0045762 A1  2/2009  Hayashi et al.
(Continued)

FOREIGN PATENT DOCUMENTS

CN    103001549 A    3/2013
EP    2106016 A2    9/2009
(Continued)

OTHER PUBLICATIONS

International Search Report for WO 2016/199491 A1, dated Jul. 5, 2016.
(Continued)

*Primary Examiner* — Muhammad S Islam
(74) *Attorney, Agent, or Firm* — Volpe and Koenig, P.C.

(57) ABSTRACT

To achieve, in a load drive device including an H-bridge circuit, miniaturization of a capacitor or/and the constituent elements of the H-bridge circuit (e.g., reduction in volume) with circuit elements, for example, switching elements included in the H-bridge circuit, being inhibited from breaking down or destroying even in a case where a load is overloaded. The invention is disclosed in which, as a solution to the achievement, first and second modes are provided as a switching mode for the switching elements 11, 12, 13, and 14 and switching is appropriately performed between the first and second modes.

7 Claims, 26 Drawing Sheets

(56) References Cited

U.S. PATENT DOCUMENTS

| | | | |
|---|---|---|---|
| 2009/0200973 A1 | 8/2009 | Uchiyama | |
| 2011/0084674 A1* | 4/2011 | Cadoux | H02M 1/36 323/282 |
| 2013/0038260 A1 | 2/2013 | Chang et al. | |
| 2015/0222206 A1 | 8/2015 | Suzuki | |
| 2015/0365019 A1* | 12/2015 | Yamamoto | H02P 1/022 318/490 |

FOREIGN PATENT DOCUMENTS

| | | |
|---|---|---|
| EP | 2394837 A1 | 12/2011 |
| JP | H09-069435 A | 3/1997 |
| JP | 2006-517380 A | 7/2006 |
| JP | 2009-136077 A | 6/2009 |
| JP | 2012-144069 A | 8/2012 |
| JP | 2014-023373 A | 2/2014 |

OTHER PUBLICATIONS

Extended European Search Report dated Jan. 17, 2019 for the European Patent Application No. 16807198.3.

* cited by examiner

LOAD DRIVE DEVICE

TECHNICAL FIELD

The present invention relates to a load drive device, and particularly relates to a load drive device that drives a load including a coil (e.g., an electric motor). For example, the present invention relates to a motor drive device applied to an electronic throttle control device in a motor vehicle.

BACKGROUND ART

A drive device using an H-bridge drive circuit, has been known as a drive device that drives a motor including a coil. The motor drive device using the H-bridge drive circuit, includes four switching elements diagonally connected to the motor to cross each other, and turns the switching elements ON or OFF in a predetermined duty cycle so that the operation state of the motor (positive rotation, negative rotation, and stop) can be controlled.

In making a switch from the operation state of the positive rotation or the negative rotation to the state of the stop, energy that has been stored and remains in the coil in the motor, is required to be discharged, and thus a method described below has been known. Refer to Patent Literature described below.

Four switching elements all are turned OFF, and a diode arranged in parallel between the drive terminals of each switching element is used to apply a bias in the forward direction between the drive terminals of each switching element through each body diode so that energy stored in a coil is discharged to the power source side through each diode.

For example, it is assumed that a motor is suddenly and excessively loaded. When the motor being loaded is left, the drive circuit thereof may break down thermally or electrically. Therefore, in a case where a load drive device or a load drive circuit detects the state where the overload has been applied, energy in the load, for example, inertial energy is required to be promptly discharged to the outside of the drive device or the outside of the circuit. The present inventors have found that, that is, control is required to be performed, for example, kinetic energy is converted into electrical energy at the point in time when the overload is detected and then the electrical energy is further converted into thermal energy, or the electrical energy is stored into a capacitor provided in the circuit.

CITATION LIST

Patent Literature

PTL 1: JP H4-138098 A
PTL 2: JP 2014-100002 A

SUMMARY OF INVENTION

Technical Problem

Recently, the cost reduction of an engine control unit (ECU) circuit is strictly required and thus the miniaturization of a motor-drive H-bridge drive circuit in the engine control unit circuit is considerably and strongly required.

FIG. 1 illustrates a circuit configuration of a related motor-drive H-bridge drive circuit. The circuit configuration is a drawing relating to the present invention.

FIG. 2 illustrates a path of a motor current when a motor 15 positively rotates in FIG. 1. The broken line of FIG. 2(a) indicates the path of the motor current when the motor drives with Vc. The broken line of FIG. 2(b) indicates the path of the motor current when the motor does not drive with Vc.

FIG. 3 illustrates the path of the motor current when the motor 15 negatively rotates in FIG. 1. The broken line of FIG. 3(a) indicates the path of the motor current when the motor drives with Vc. The broken line of FIG. 3(b) indicates the path of the motor current when the motor does not drive with Vc.

The broken line of FIG. 4(a) indicates the path of the motor current according to a related technique when an excess current flows into the motor 15 in the positive rotation in FIG. 1.

The broken line of FIG. 4(b) indicates the path of the motor current according to the related technique when the excess current flows into the motor 15 in the negative rotation in FIG. 1.

The motor-drive H-bridge drive circuit relating to the present invention includes, as illustrated in FIG. 1, a controller 18, switching elements 11, 12, 13, and 14 each having a body diode (as illustrated in FIG. 1, the switching elements each connected in parallel to the body diode), a motor mechanism 15, a capacitor 17, a motor current detector 19, an excess current determiner 20, a positive-rotation motor current sensing unit 21, a negative-rotation motor current sensing unit 22.

The capacitor 17 is provided to achieve stabilization and noise reduction of the power source voltage of the H-bridge drive circuit.

The controller 18 performs predetermined ON/OFF control to the switching elements 11, 12, 13, and 14 so as to control the operation of the motor 15.

In a case where the motor 15 operates to positively rotate, when the switching elements 11 and 14 are simultaneously turned ON, the motor current flows in the direction of reference sign I1 indicated in FIG. 2(a) (the arrow of the broken line of FIG. 2(a)). The value of the motor current rises. Next, when either a set of the switching elements 11 and 12 or a set of the switching elements 13 and 14, is simultaneously turned ON, the motor current flows in the direction of a reference sign current I2 indicated in FIG. 2(b) (the arrow of the broken line of FIG. 2(b)). The value of the motor current falls. The operation of the switching elements is repeated (as illustrated in FIGS. 2(a) and 2(b), a switch is made between the sets of the switching elements to be turned ON/OFF). With this arrangement, the value of the motor current repeatedly rises and falls on a micro basis but the value of the current substantially remains constant on a macro basis. In this manner, the controller 18 is used to control the switching elements to be turned ON/OFF so that a constant current in the positive direction flows into the motor.

In a case where the motor is desired to operate to negatively rotate, the switching elements 12 and 13 illustrated in FIG. 3(a) are simultaneously turned ON. Then, the motor current flows in the direction of I3 indicated in FIG. 3(a) (the arrow of the broken line of FIG. 3(a)) so that the value of the motor current rises. Next, any one of the set of the switching elements 11 and 12 and the set of the switching elements 13 and 14, is simultaneously turned ON. Then, the motor current flows in the direction indicated with reference sign I4 in FIG. 3(b) (the arrow of the broken line of FIG. 3(b)) so that the value of the motor current falls. The controller 18 controls, for example, the ON/OFF timing of each switching element so that the operation of the switching elements are repeated (namely, the operation of making a switch between the sets of the switching elements to be turned ON/OFF). With this arrangement, a reverse current having a desired value flows into the motor.

The controller 18 controls, for example, the ON/OFF timing of each of the switching elements 11, 12, 13, and 14 with an instruction signal from the motor mechanism 15 so that the current flowing into the motor has a necessary current value.

The positive-rotation motor current sensing unit 21 and the negative-rotation motor current sensing unit 22 illustrated in FIG. 1 include units that sense the current flowing into the switching element 11 and the current flowing into the switching element 12 so as to sense the motor current when the motor positively rotates and the motor current when the motor negatively rotates, respectively.

The motor current detector 19 includes a circuit that converts, into voltage signals, current signals flowing into the motor, sensed from the positive-rotation motor current sensing unit 21 and the negative-rotation motor current sensing unit 22.

The excess current determiner 20 determines that the current value flowing into the motor is the excess current when each voltage value based on the voltage signals from the motor current detector 19, exceeds a voltage value being an excess current determination threshold value, and outputs a signal in which the excess current has been determined, to the controller 18.

In a case where the motor positively rotates and the excess current flows into the motor, the motor current flows into the positive-rotation motor current sensing unit 21 and a sensing signal of the sensing unit 21 is input into the motor current detector 19. Then, the excess current determiner 20 determines the excess current, and a determination signal thereof is input into the controller 18.

In a case where the excess current flows into the motor, examples of a method of promptly stopping the motor includes a publicly known conventional method 1 and a publicly known conventional method 2.

The conventional control method 1 includes controlling all the switching elements 11 to 14 to be turned OFF with a control signal from the controller 18 after the switching elements 11 to 14 illustrated in FIG. 1 each performs a predetermined operation. Note that the control method 1 and the control method 2 themselves have been publicly known, but the entirety or part of the circuit of FIG. 1 has been not necessarily publicly known.

The motor 15 includes a coil, and the method of controlling the switching elements 11 to 14 in a case where the coil in the motor 15 has electrical energy having a predetermined value or more, will be described. All the switching elements 11 to 14 are controlled to be turned OFF in a case where it is determined that the current flowing into the motor 15 is excessive, namely, the excess current has occurred, while a desired current is flowing through the motor 15 with the switching 11 to 14 performed with desired ON/OFF control. In this case, the motor current 15 illustrated in FIG. 4(*a*) (the arrow of the broken line of FIG. 4(*a*)), continues to flow through the body diodes of the switching elements 12 and 13 in a direction the same as the directions of the motor currents I1 and I2 in the positive rotation. That is, even when the switching elements 12 and 13 have been turned OFF, the current continues to flow through the body diodes. With this operation, the energy stored in the coil of the motor 15 reaches the capacitor 17 and then is absorbed in the capacitor 17 so that the voltage across the capacitor 17 rises.

The capacitor 17 including an electrolytic capacitor typically having large capacitance (e.g., the electrolytic capacitor having a capacitance of 47 uF is used), is used in order to inhibit a variation in voltage at the portion. Ceramic capacitors are smaller than field capacitors in external dimensions. However, simply replacing the electrolytic capacitor of the capacitor 17 with a ceramic capacitor, is not an advisable plan in order to miniaturize the volume of the capacitor occupying the circuit device. That is, typically, a large number of ceramic capacitors are smaller than field capacitors in capacitance. For example, the ceramic capacitors each are approximately 10 uF. It is assumed that, for example, a field capacitor of 47 μF is replaced with a ceramic capacitor of 10 μF for the capacitor in a load drive circuit or in the motor-drive H-bridge drive circuit. In the circuit device in which such replacement has been performed, in a case where the device detects the overload of the motor, namely, the excess current to control the motor to stop, a rise in the voltage across the capacitor 17 (here, for example, it is assumed that the ceramic capacitor of 10 μF is used) causes the voltage values of the capacitor 17 and the switching elements 11 and 12 to exceed withstand voltage values so that the capacitor 17 included in part of the H-bridge circuit may destroy or break down.

In a case where the excess current flows into the motor (the arrow of the broken line of FIG. 4(*b*)) while the motor is negatively rotating, the current direction is reverse to that in the positive rotation, but the operation itself of the H-bridge circuit is the same as the above. That is, when the eddy current is detected, all the switching elements are controlled to be turned OFF and the motor is promptly stopped.

The conventional method 2 includes controlling, for the switching elements 11 to 14 that have been performed with the predetermined ON/OFF control before control starts, the switching elements 11 to 14 to simultaneously turn the switching elements 13 and 14 (or the switching elements 11 and 12) ON and to simultaneously turn the other switching elements OFF, with the control signal from the controller 18. (as illustrated in FIG. 2(*b*)).

With the coil component in the motor 15 (the electrical energy stored in the coil), the motor current I2 when the switching elements 13 and 14 (or the switching elements 11 and 12) are simultaneously turned ON, continues to flow in the direction of the arrow of the broken line of FIG. 2(*b*). The direction in which the current flows is the same as the directions of the motor currents I1 and I2 in the positive rotation. That is, the motor current I2 continues to flow similarly to a normal operation before the motor is excessively loaded. In this case, the energy stored in the coil in the motor 15 is consumes by the insides of the switching elements 13 and 14 (or the switching elements 11 and 12) and the resistance component of the motor 15. The voltage across the capacitor 17 does not rise (no current flows in a direction in which the capacitor 17 is present), but there is a problem that the temperatures (the chip temperatures) of the switching elements 13 and 14 (or the switching elements 11 and 12) rise.

In order to inhibit a rise in temperature at each portion, a heat dissipation device is required to be enhanced for the entirety of the H-bridge circuit or the ECU circuit. When the heat dissipation device (e.g., heat dissipation fins of the elements) provided to the load drive circuit is omitted or the heat dissipation device is excessively miniaturized in order to miniaturize the load drive circuit, the temperatures (the chip temperatures) of the switching elements 13 and 14 (or the switching elements 11 and 12) excessively rise so that the H-bridge circuit may destroy or breaks down.

When the motor negatively rotates and the excess current flows (the arrow of the broken line of FIG. 3(b)), the operation of the H-bridge circuit is the same as that in the positive rotation although the current direction is reverse to that in the positive rotation.

An object of the present invention is to achieve, in a load (e.g., a motor) drive device including an H-bridge circuit, miniaturization of a capacitor or/and the constituent elements of the H-bridge circuit (e.g., reduction in volume) with circuit elements included in the H-bridge circuit, for example, switching elements, being inhibited from breaking down or destroying even in a case where a load is excessively loaded. That is, the miniaturization referred to here is to miniaturize the size of a load drive circuit with, for example, reduction of the capacitance value of the capacitor on the input side of the H-bridge circuit and completely omission of the heat dissipation device of the H-bridge circuit. Simultaneously with the miniaturization, the entire device cost is to be lower than the conventional cost, with component cost reduction of the load drive circuit device.

Solution to Problem

A solution to the problems is, for example, as follows:

A load drive device includes: a first switching element including either a first source terminal or a first drain terminal connected to a side of power source potential and either the first drain terminal or the first source terminal connected to one end terminal of a coil load; a second switching element including either a second drain terminal or a second source terminal connected to a side of ground potential and either the second source terminal or the second drain terminal connected to either the first drain terminal of the first switching element or the second source terminal; a third switching element including either a third source terminal or a third drain terminal connected to the side of the power source potential and either the first drain terminal or the first source terminal connected to another terminal of the load; a fourth switching element including either a fourth drain terminal or a fourth source terminal connected to the side of the ground potential and either the fourth source terminal or the fourth drain terminal connected to either the third drain terminal or the third source terminal of the third switching element; a capacitor including both end terminals connected between the power source potential and the ground potential; a voltage measurement unit configured to measure a voltage across the capacitor; and a control unit configured to individually turn the first to fourth switching elements ON or OFF. The voltage measurement unit detects whether a value of the voltage across the capacitor is not less than a predetermined voltage value set based on withstand voltage values of the first to fourth switching elements or is less than the predetermined voltage value. The control unit performs switching control between a first mode and a second mode in an operation mode in which the first to fourth switching elements connected to the load are turned ON or OFF. The control unit operates the first to fourth switching elements in the first mode in a case where the voltage across the capacitor is not less than the predetermined voltage value, and operates the first to fourth switching elements in the second mode in a case where the voltage across the capacitor is less than the predetermined value. The first mode is the operation mode in which all the first to fourth switching elements are turned OFF. The second mode turns either the second or fourth switching element ON and turns all the other first to fourth switching elements OFF so as to form a closed current path including the coil load and the ground potential. A capacitance value of the capacitor is determined based on a difference energy value between an energy value stored in the load at time at which occurrence of an excess current in the load is detected and an energy value consumed by either the second or fourth switching element with a current flowing into either the second or fourth switching element in the second mode after the detection of the excess current. The voltage across the capacitor is determined to a value of the predetermined voltage value or less, the voltage across the capacitor rising with electrical energy supplied, through the load and diode elements connected in parallel to the first to fourth switching in the first operation mode, to the diodes.

Advantageous Effects of Invention

According to the present invention, for example, the value in voltage rise and the value in temperature rise between the elements of each of the switching elements included in the H-bridge circuit, both can be reduced. Therefore, for example, the product specifications required by customers, can be satisfied. For example, in a case where the capacitor is required to switch from a conventional field capacitor to a ceramic capacitor smaller than the field capacitor in capacitance, in order to satisfy the requirements of miniaturization and cost reduction of the devices of the customers, it is difficult to inhibit the circuit elements from electrically or thermally destroying only with simple capacitor replacement. It is also difficult to inhibit the ceramic capacitor having the small capacitance from electrically breaking down or destroying. However, according to the present invention, therefore, the capacitor 17 as a circuit element can switch from the electrolytic capacitor to the ceramic capacitor and additionally reduction of the heat dissipation device for the H-bridge circuit can be made with the devising of the control method and the load drive method described above. With this arrangement, the H-bridge drive circuit can be miniaturized and cost reduction of the ECU circuit can be achieved.

BRIEF DESCRIPTION OF DRAWINGS

FIG. 2(a) illustrates the path of the motor current when the motor drives with Vc. FIG. 2(b) illustrates the path of the motor current when the motor does not drive with Vc.

FIG. 3(a) illustrates the path of the motor current when the motor drives with Vc. FIG. 3(b) illustrates the path of the motor current when the motor does not drive with Vc.

DESCRIPTION OF EMBODIMENTS

Embodiments of the present invention will be described in detail below with reference to the drawings.

First Embodiment

Figure 5:
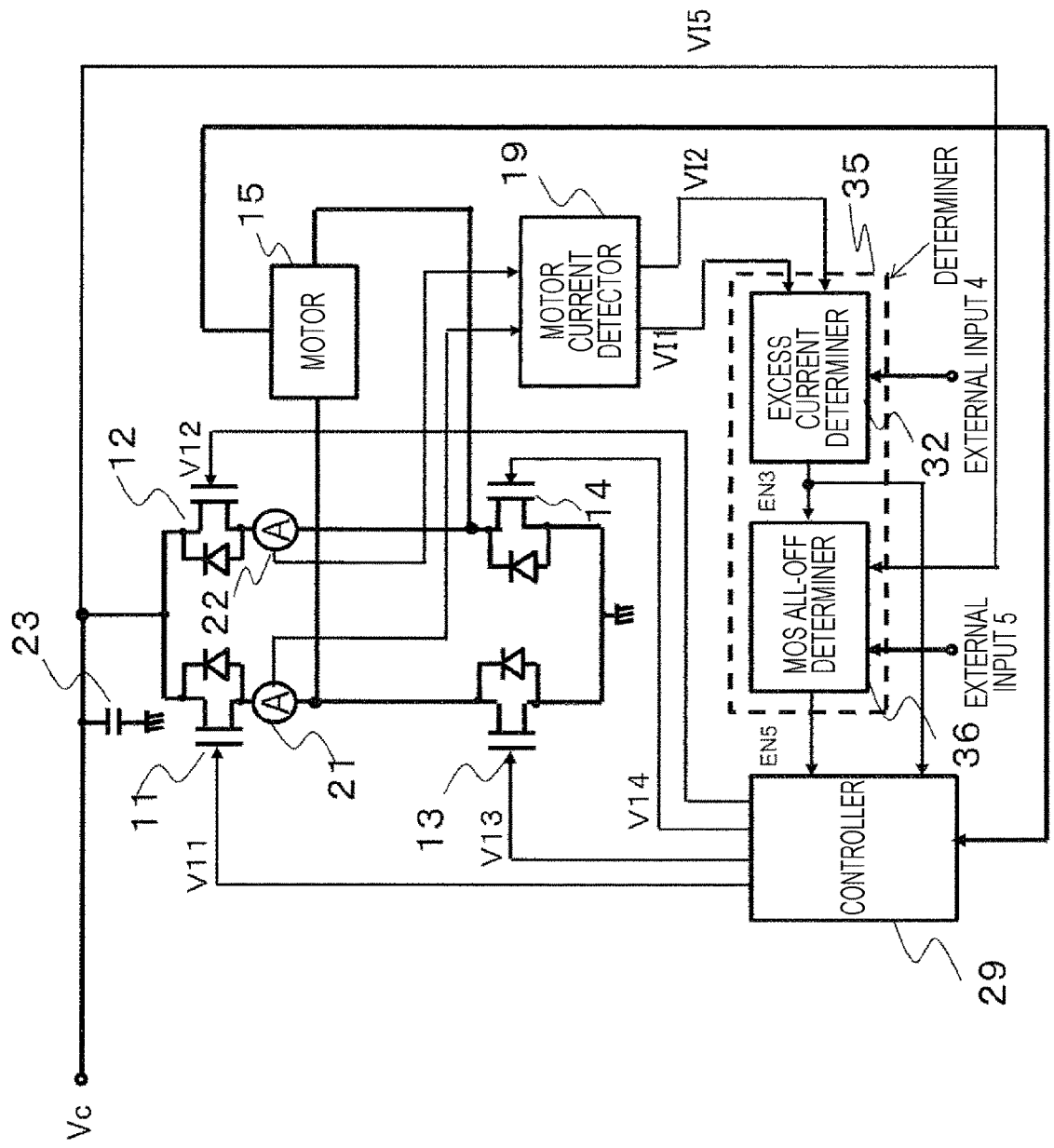
FIG. 5 illustrates a circuit configuration of a motor-drive H-bridge drive circuit according to a first embodiment.

FIG. 5 illustrates a circuit configuration of a motor-drive H-bridge drive circuit according to a first embodiment.

The motor-drive H-bridge drive circuit according to the first embodiment, includes a controller 29, switching elements 11, 12, 13, and 14 each having a body diode, a motor mechanism 15, a capacitor 23, a motor current detector 19, a determiner 35, a positive-rotation motor current sensing unit 21, and a negative-rotation motor current sensing unit 22. Note that the body diodes are preferably connected to the switching elements 11 to 14 so as to have a direction illustrated in FIG. 5. The body diodes are connected in parallel to the switching elements as illustrated so that the body diodes each allow a current to flow through the illustrated portion in an upper direction even in a case where the switching elements are turned OFF.

Figure 1:
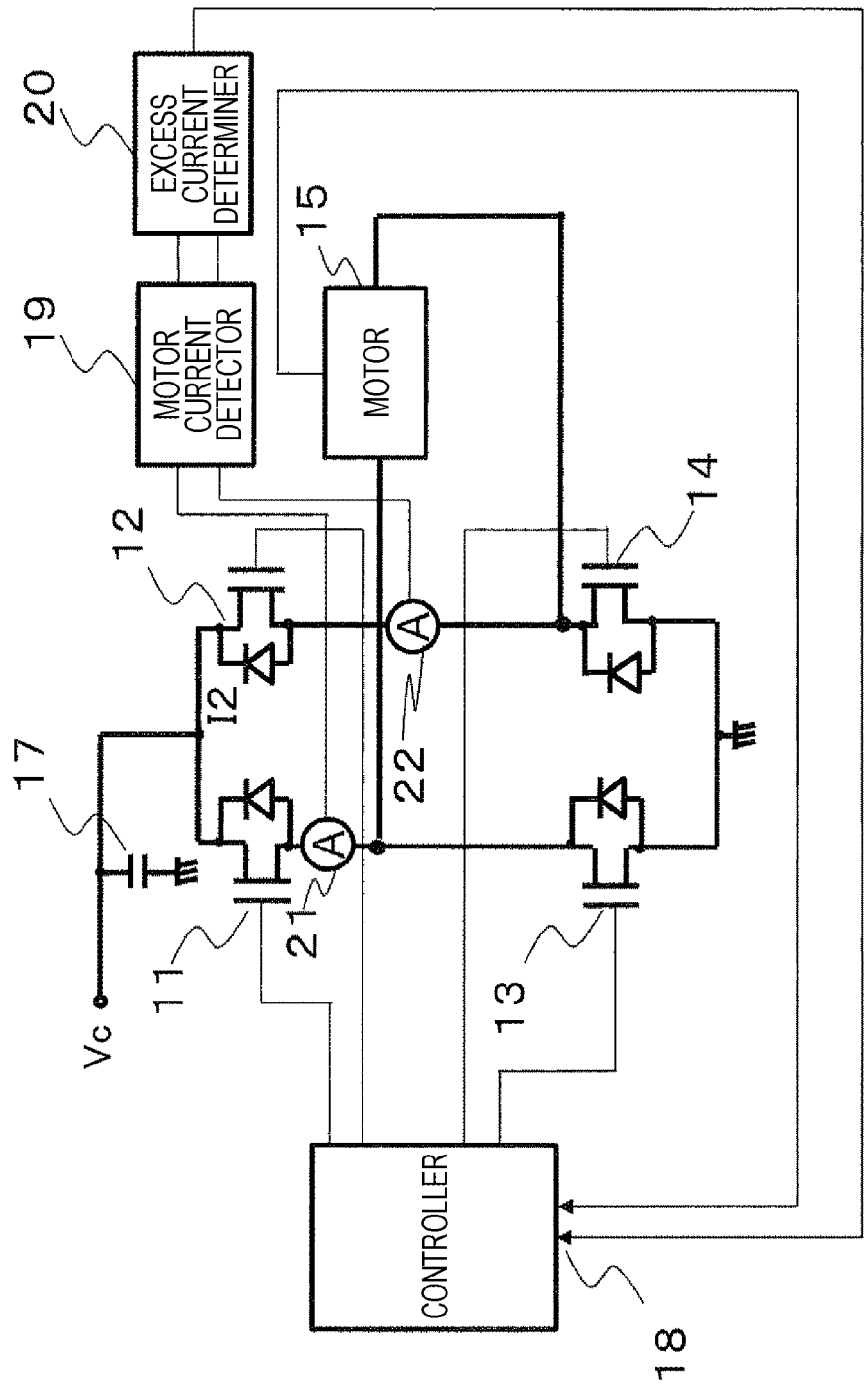
FIG. 1 illustrates a circuit configuration of a motor-drive H-bridge drive circuit for describing the background art of the present invention.

The capacitor 23 and the switching elements 11, 12, 13, and 14 each having the body diode, the positive-rotation motor current sensing unit 21, and the negative-rotation motor current sensing unit 22 are similar to those in the motor-drive H-bridge drive circuit being a related technique illustrated in FIG. 1. Therefore, the descriptions of the circuit elements will be omitted.

Figure 2:
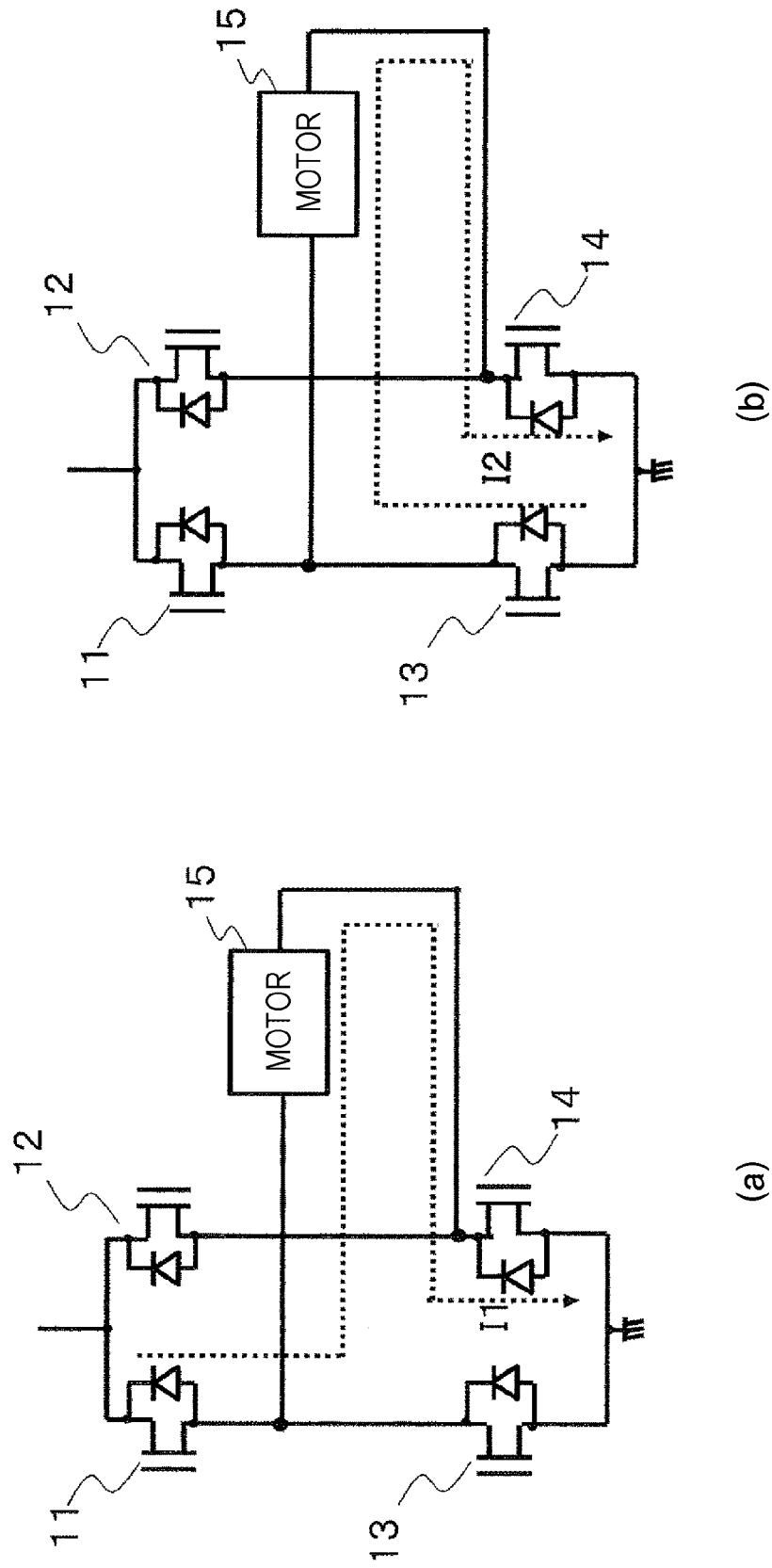
FIG. 2 illustrates a path of a motor current when a motor 15 positively rotates in FIG. 1.

The motor current detector 19 includes a circuit unit that converts, into voltage signals, current signals flowing into the motor, sensed from the positive-rotation motor current sensing unit 21 and the negative-rotation motor current sensing unit 22. As illustrated in FIG. 2, in a case where the motor 15 positively rotates, the motor current detector 19 detects the current flowing into the motor 15 so as to output the current as an output voltage VI1. In this case, since the switching element 12 is not used, the current flowing into the switching element 12 is zero. Therefore, an output voltage VI2 becomes zero. In a case where the motor 15 operates to negatively rotate as in FIG. 3, the motor current detector 19 detects the current flowing into the motor 15 so as to output the current as the output voltage VI2. In this case, since the switching element 11 is not used, the current flowing into the switching element 11 is zero. Therefore, the value of the output voltage VI1 becomes zero.

The motor mechanism 15 includes the motor and a mechanism that measures the rotation speed and rotation direction of the motor. That is the motor mechanism 15 includes the measurement mechanism in addition to the motor body.

The controller 29 controls the switching elements 11, 12, 13, and 14 to bring the operation of the motor in the motor mechanism 15, into any one of the following six types of modes. As a switching mode for reducing a current value, for the switching elements 11 to 14 in the modes, a first mode (hereinafter, also referred to as a mode 1 in the specification) and a second mode (hereinafter, also referred to as a mode 2 in the specification) are used according to the present invention.

According to the present invention, instead of simply combining the first mode and the second mode, an important point is, for example, with which timing switching from the first mode to the second mode is performed. The timing is basically that the switching is performed with predetermined timing to enable the object of the present invention to be achieved.

According to the operation of the mode 1, the chip temperatures of the switching elements rise, but the voltage across the capacitor 23 and the respective voltage values across the switching elements 11, 12, 13, and 14 do not rise. Meanwhile, according to the operation of the mode 2, the respective voltage across the capacitor 23 and the switching elements 11, 12, 13, and 14 rise, but characteristically the chip temperatures of the switching elements do not rise as high as in the mode 1.

The next six operation modes are assumed.

(1) A state where the motor positively rotates, the motor being in a normal state.

(2) A state where the motor negatively rotates, the motor being in the normal state.

Here, the positive rotation and the negative rotation are defined as follows: That is, when a case where the motor rotates in one direction, is defined as the positive rotation, a case where the motor rotates in a direction reverse to the one direction, is defined as the negative rotation.

(3) A state where the motor positively rotates in the mode 1 (the first mode) after it is detected that the motor is in an excess current state.

(4) A state where the motor positively rotates in the mode 2 (the second mode) after it is detected that the motor is in the excess current state.

(5) A state where the motor negatively rotates in the mode 1 (the first mode) after it is detected that the motor is in the excess current state.

(6) A state where the motor negatively rotates in the mode 2 (the second mode) after it is detected that the motor is in the excess current state.

The controller 29 performs ON/OFF control to the respective gates of the switching elements 11, 12, 13, and 14 with a signal relating to the rotation speed and rotation direction of the motor, from the motor mechanism 15 in the operation mode (1) or (2) so that the current flowing into the motor 15 has a necessary current value.

FIGS. 2(a) and 2(b) illustrate the path of the current in a case where the operation of the motor is normal and the motor positively rotates. In FIG. 2(a), the switching-elements 11 and 14 are ON and the switching elements 12 and 13 are OFF. In FIG. 2(b), the switching elements 13 and 14 are ON and the switching elements 11 and 12 are OFF.

FIGS. 3(a) and 3(b) illustrate the path of the current in a case where the operation of the motor is normal and the motor negatively rotates. In FIG. 3(a), the switching elements 12 and 13 are ON and the switching elements 11 and 14 are OFF. In FIG. 3(b), the switching elements 13 and 14 are ON and the switching elements 11 and 12 are OFF.

In a case where the excess current of the motor is detected when the motor is in the positive rotation state, the controller 29 makes a switch from the operation mode (1) to the operation mode (3) or (4) with an instruction signal EN3 from a determiner 32. After that, with an instruction signal EN5 from a determiner 36, the ON/OFF timing of each of the switching elements 11, 12, 13, and 14 is controlled to make a switch from the operation mode (3) to the operation mode (4) or from the operation mode (4) to the operation mode (3).

Figure 4:
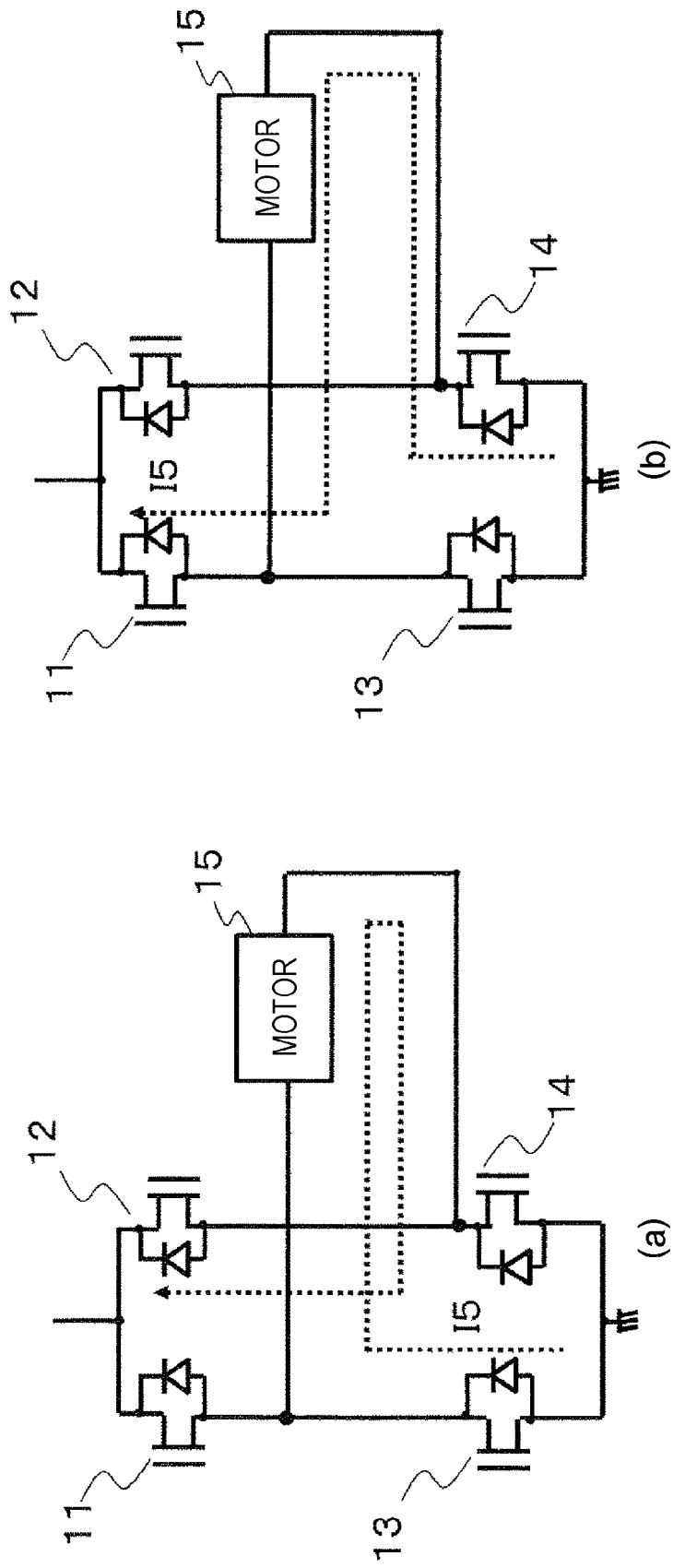
FIG. 4 is a diagram illustrating the path of the motor current in a current reduction mode 2 when the motor positively rotates (illustrated in (a)) and the path of the motor current in the current reduction mode 2 when the motor negatively rotates (illustrated in (b)), in an excess current of the motor illustrated in FIG. 1.

The ON/OFF operations of the switching elements 11, 12, 13, and 14 and the path of the motor current in this case, are illustrated in FIG. 2 (b: the mode 1 for reducing the current value in the motor excess current in the positive rotation state) and FIG. 4 (a: the mode 2 for reducing the current value in the motor excess current in the positive rotation state).

When it is detected that the motor has been brought into the excess current state in a case where the motor is in the negative rotation state, the controller 29 makes a switch from the mode (2) to the mode (5) or the mode (6) with the instruction signal EN3 from the determiner 32. After that, with the instruction signal EN5 from the determiner 36, the gates of the switching elements 11, 12, 13, and 14 each are controlled to be turned ON/OFF to make a switch from the mode (5) to the mode (6) or from the mode (6) to the mode (5).

Figure 3:
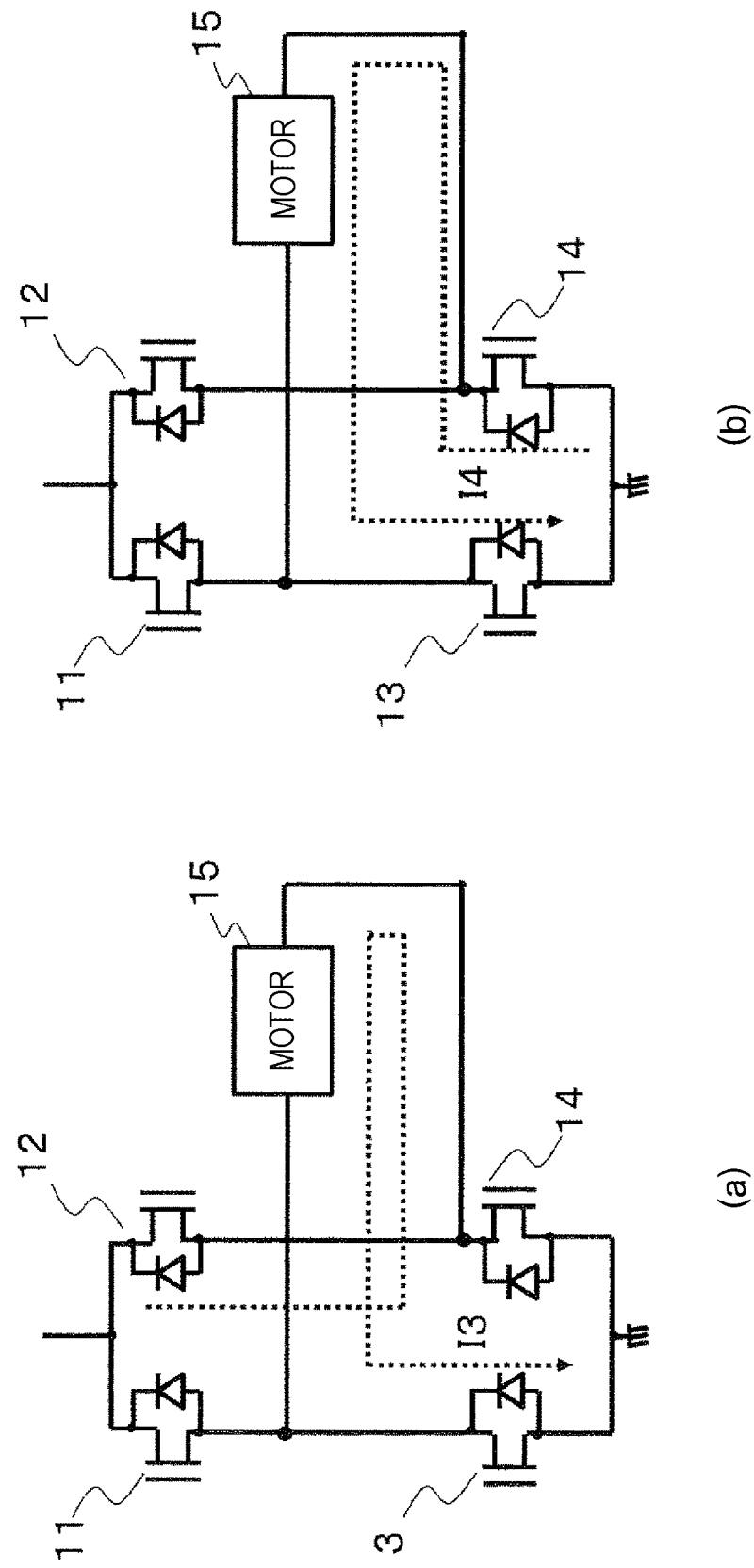
FIG. 3 illustrates the path of the motor current when the motor 15 negatively rotates in FIG. 1.

The ON/OFF operations of the switching elements 11, 12, 13, and 14 and the path of the motor current in this case, are illustrated in FIG. 3 (b: the current reduction mode 1 in the motor excess current in the negative rotation state) and FIG. 4 (b: the current reduction mode 2 in the motor excess current in the negative rotation state).

Here, in order to simplify descriptions, the operations according to the present embodiment will be described with, as an example, the operation state of the H-bridge drive circuit when the motor is in the positive rotation state.

The determiner 35 illustrated in FIG. 5 includes the excess current determiner 32 and the MOS all-OFF determiner 36.

Figure 6:
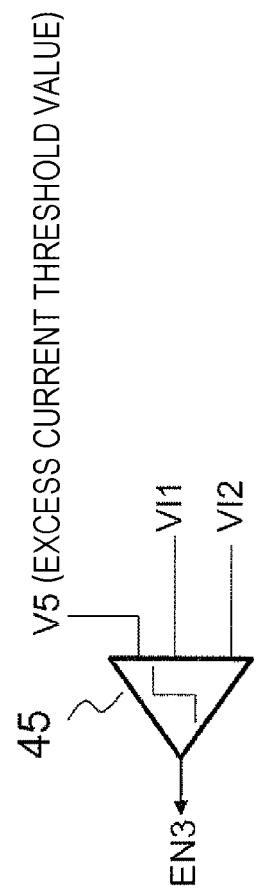
FIG. 6 illustrates an exemplary configuration of an excess current determiner according to the first embodiment.

FIG. 6 illustrates an exemplary configuration of the excess current determiner 32. The excess current determiner 32 includes a comparator 45 and has the input terminal of an excess current threshold value V5. The excess current threshold value V5 can be adjusted with the value of an external input 4.

Figure 7:
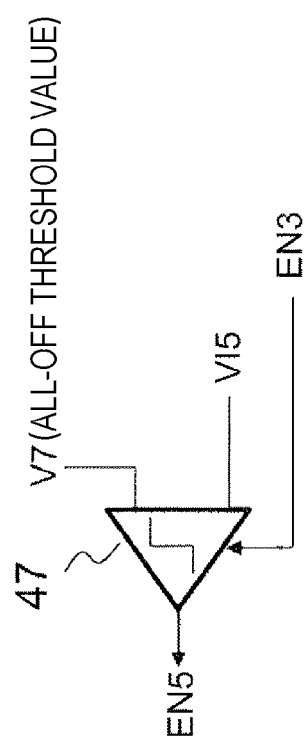
FIG. 7 illustrates an exemplary configuration of a MOS all-OFF determiner according to the first embodiment.

FIG. 7 illustrates an exemplary configuration of the configuration of the MOS all-OFF determiner 36. The MOS all-OFF determiner 36 includes a comparator 47 and has the input terminal of an all-OFF threshold value V7. The all-OFF threshold value V7 can be adjusted with the value of an external input 5. The operation start of the MOS all-OFF determiner 36 is determined with the output signal EN3 from the excess current determiner 32.

Figure 8:
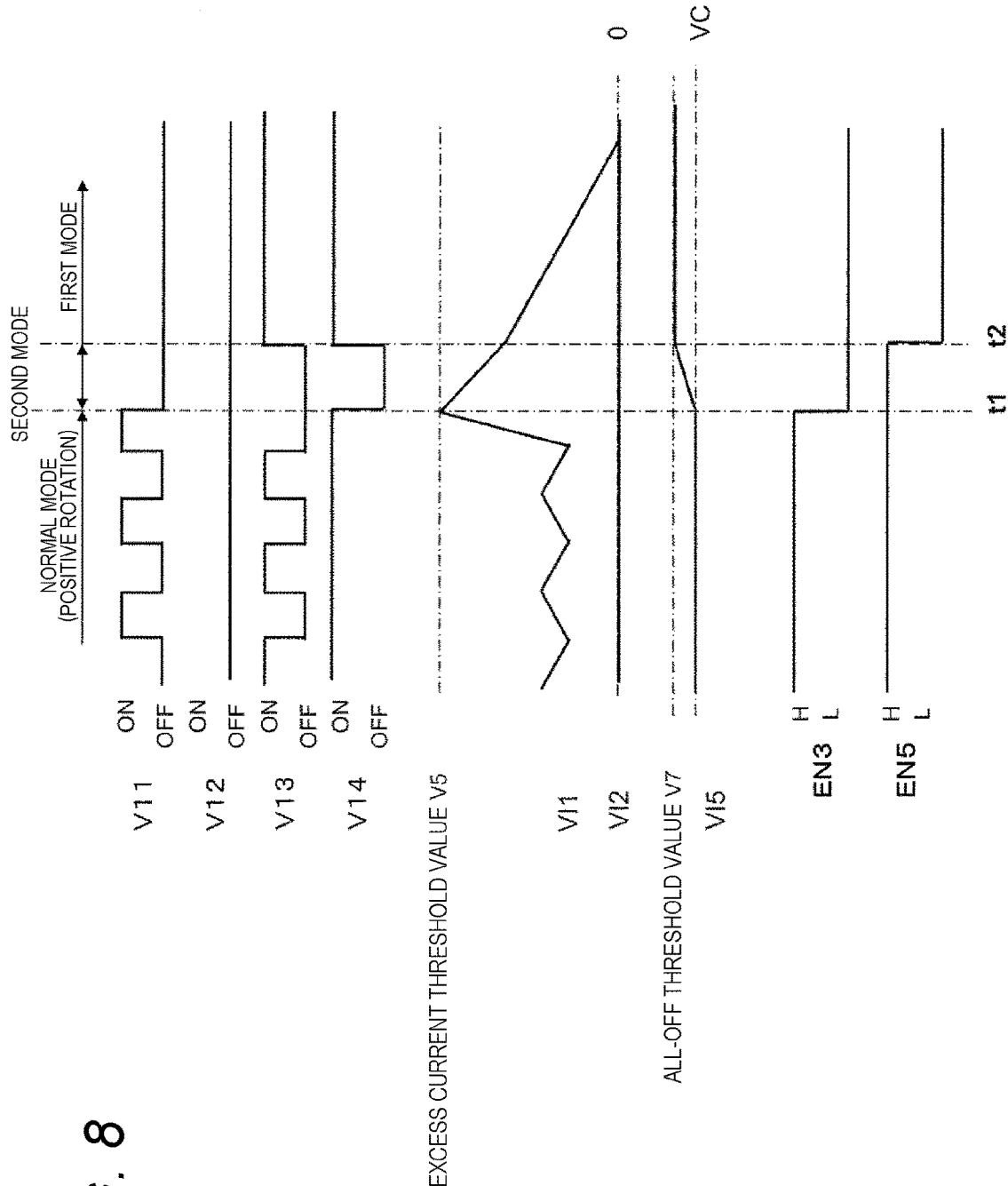
FIG. 8 is a timing chart illustrating the operations of the excess current determiner and the MOS all-OFF determiner according to the first embodiment.

FIG. 8 illustrates the operations of the excess current determiner 32 and the MOS all-OFF determiner 36. The flowchart of FIG. 9 illustrates switching between the operation modes of the motor.

Figure 9:
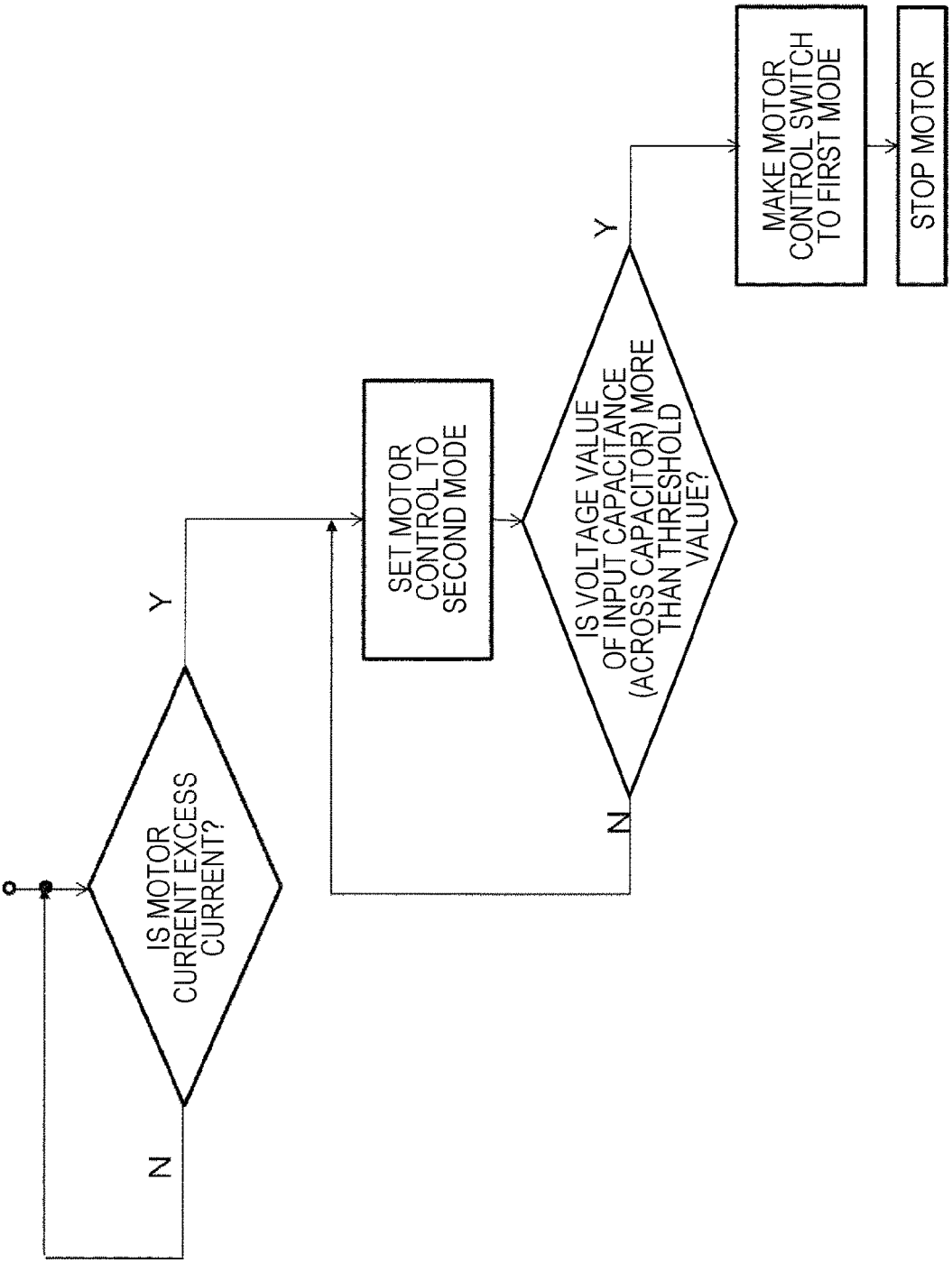
FIG. 9 is a flowchart illustrating a mode switching flow of the H-bridge drive circuit according to the first embodiment.

FIG. 9 will be described below.

The motor positively rotates or negatively rotates. When the motor starts operating, namely, when the motor starts rotating, it is constantly confirmed whether the motor is in the excess current state.

In a case where no excess current state occurs, the monitoring continues.

When the excess current state is detected, the processing proceeds to the next step and motor control is set into the second mode. As illustrated next, a branch of whether the second mode continues or the motor control switches to the first mode, occurs on the basis of whether the voltage value of input capacitance (across the capacitor) exceeds a threshold value. In a case where the motor control has switched to the first mode, the control of the first operation mode still continues and the motor finally stops. When the voltage signal VI1 from the motor current detector 19 becomes higher than the excess current threshold value V5 in the comparator 45 of the excess current determiner 32 (time t1 of FIG. 8) in a case where the motor is in the positive rotation mode, it is determined that the motor current is in the excess current state and then the output signal EN3 of the comparator 45, namely, of the excess current determiner 32, varies from HIGH to LOW. In this case, the controller 29 controls the switching elements 11, 12, 13, and 14 to be turned all-OFF. With this arrangement, the operation state of the motor varies from the normal state and the positive rotation state to the positive rotation state and the current reduction mode 2 (the second operation mode) in the motor excess current. With this arrangement, electrical energy stored in a coil in the motor is discharged to the power source side through the respective body diodes connected in parallel to the switching elements 12 and 13 so that the value of the motor current falls. With this arrangement, the excess current state is avoided.

When the motor positively rotates, the voltage value of the capacitor 23 is input into the MOS all-OFF determiner 36. At the time t1, the output signal EN3 of the excess current determiner 32 varies from HIGH to LOW. Accordingly, the comparator 47 of the MOS all-OFF determiner 36 starts operating.

After the time t1, the voltage value across the capacitor 23 rises. Together with the rise, when the voltage value across the capacitor 23 becomes higher than the all-OFF threshold value V7 in the comparator 47 of the MOS all-OFF determiner 36 (this time is defined as time t2 as illustrated in FIG. 8), the output signal EN5 of the comparator 47, namely, of the MOS all-OFF determiner 36 varies from HIGH to LOW. In this case, the controller 29 controls the switching elements 11 and 12 to be simultaneously turned OFF and the switching 13 and 14 to be simultaneously turned ON.

Instead of this, the switching elements 11 and 12 may be controlled to be simultaneously turned ON and the switching 13 and 14 may be controlled to be simultaneously turned OFF. In this case, the motor in mode switches from the positive rotation state and the mode 2 to the positive rotation state and the mode 1. In this case, the energy stored in the coil in the motor, is consumed by the switching elements 13 and 14 and the resistance component in the motor so that the value of the motor current falls. An escape from the excess current state, is made. In this case, since the energy stored in the coil in the motor is not discharged to the capacitor 23, the voltage across the capacitor 23 does not rise.

As a measure in the motor excess current, an effect according to the present embodiment, acquired in comparison to the control method including independently using any mode of the operation mode 1 and the operation mode 2 described as the comparative techniques, is as follows:

In a case where, first, a switch is made to the second mode after the excess current of the motor is detected, only part of the energy stored in the coil component of the motor 15 is discharged to the capacitor 23 so that a voltage Vc applied to the switching elements 11 and 12 and the capacitor 23, rise. However, after that, for example, making a switch from the second mode to the first mode with the predetermined timing described claim 1, can reduce the degree of the rise of the voltage value across each of the switching elements 11 and 12 and the capacitor 23 in comparison to that in the conventional method 1.

The remains of the energy stored is the coil component of the motor 15, are consumed by the switching elements 13 and 14 (or the switching elements 11 and 12) after the switch is made from the mode 2 for reducing the current value to the mode 1 for reducing the current value, so that the temperatures (the chip temperatures) of the switching elements 13 and 14 (or the switching elements 11 and 12) rise. However, since the part of the energy stored in the coil component of the motor 15 has already been discharged to the capacitor 23 in the mode 2, the temperature rises of the temperatures (the chip temperatures) of the switching elements 13 and 14 (or the switching elements 11 and 12) can be smaller than those in a case where only the conventional method 2 is independently is used.

Therefore, even when the capacitor 23 (e.g., a ceramic capacitor of 10 µF) smaller than the capacitor 17 in capacitance is used in the present embodiment instead of the capacitor 17 in the conventional method 1 (e.g., the field capacitor of 47 µF), the voltage rises of the capacitor 23 and the switching elements 11 and 12 can be inhibited within a specification range. The rises of the temperatures (the chip temperatures) of the switching elements 13 and 14 (or the switching elements 11 and 12) can be inhibited within the specification range even in a condition (e.g., a case where no heat sinks are provided to the elements) severer than the heat dissipation condition of the conventional method 2. That is, the chip temperature rises can be smaller than the conventional chip temperature rises.

Therefore, the H-bridge circuit can be prevented from destroying so that miniaturization of the device according to the present embodiment can be achieved.

The switching point from the mode 2 to the mode 1 (namely, switching timing) is the point in time when the voltage value Vc of the capacitor 23 becomes the voltage V7 (or the timing is as described in claim 1). The voltage V7 is set to a voltage that does not exceed the withstand voltages of the switching elements 11, 12, 13, and 14 in the H-bridge circuit. That is, the voltage V7 is a value set by a designer in designing. The switching elements each have a plurality of withstand voltage values, such as the withstand voltage value between the drain and the source, the withstand voltage value between the drain and the gate, the withstand voltage value between the source and the gate, the withstand voltage value between the source, the drain, and the substrate (the back gate), the breakdown voltage value between the drain and the source, and the breakdown voltage value between the source and the gate. The withstand voltage value referred to here, is the lowest withstand voltage value or the severest value in the plurality of withstand voltage values.

Only the voltage V7 is required at least to be set in order to achieve only the inhibition of the voltage rises of the capacitor 23 and the switching elements 11 and 12 within the specification range, but the capacitance value C (F) of the capacitor 23 is required to be determined in the following calculation in order to inhibit the temperature rises within the specification range.

First, energy consumption Q (J) in the current reduction mode 1 is acquired by Mathematical Formula 1.

Note that, Δ (delta) $T_{spec}$ (K) represents the temperature rise allowable value of each H-bridge IC chip, M ($m^3$) represents the volume of each chip, and T ($J/m^3 \cdot K$) represents the heat capacity of a silicon material used for each chip. In this case, it is assumed that no heat dissipation condition is provided to the chips.

$$Q = T*M*\Delta T_{spec} \qquad \text{Mathematical Formula 1}$$

Next, the capacitance value C (F) of the capacitor 23 is acquired by Mathematical Formula 2.

$$C = (L \times I2 - 2Q)/(V72 - VB2) \qquad \text{Mathematical Formula 2}$$

Note that, L (H) represents the value of the inductor component of the motor, I (A) represents the excess current value flowing into the motor, and VB (V) represents the voltage value of a battery.

The capacitor 23 acquired in accordance with the formulae, is connected to the H-bridge circuit. In discharging the energy of the motor 15, the current reduction mode 2 operates when the voltage value Vc of the capacitor 23 is less than the threshold value V7 and the current reduction mode 1 operates when the voltage value Vc of the capacitor 23 is the threshold value V7 or more. Thus, the voltage rises and the temperature rises each can be inhibited within the specification range.

Second Embodiment

For the first embodiment, a circuit that measures the voltage across the capacitor 23 is required to be added. With this arrangement, the area of the H-bridge drive circuit device (e.g., the area of a circuit board) may increase. According to the present embodiment, a current flowing through a motor 15 is measured without a voltage measurement circuit of a capacitor 23 so that mode switching is achieved.

Figure 10:
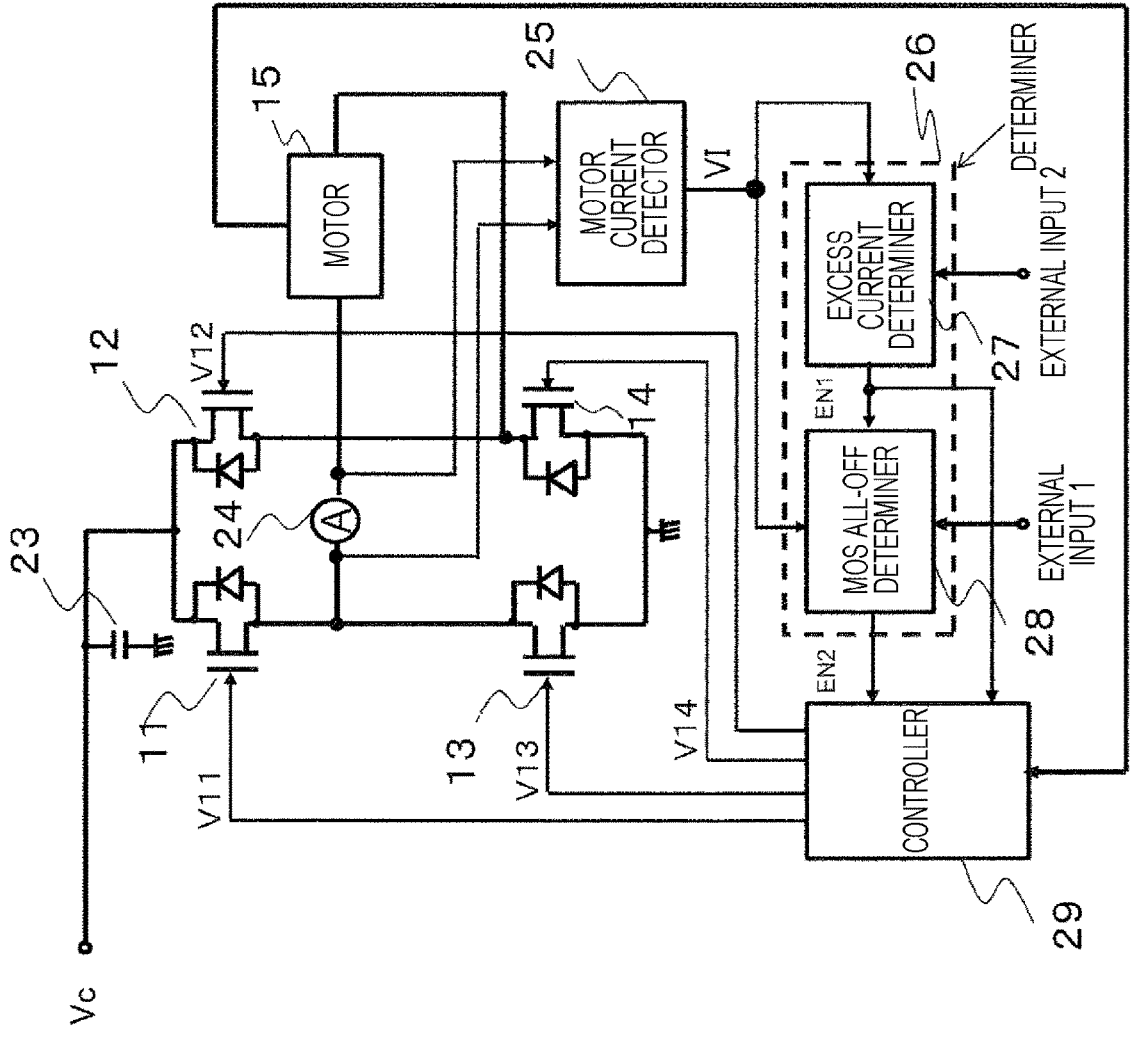
FIG. 10 illustrates a circuit configuration of a motor-drive H-bridge drive circuit according to a second embodiment.

FIG. 10 is a diagram of a configuration according to a second embodiment. The same constituent elements in FIGS. 10, 5, and 1 are denoted with the same reference signs.

FIG. 10 illustrates a circuit configuration of a motor-drive H-bridge drive circuit according to the second embodiment.

The motor-drive H-bridge drive circuit according to the second embodiment, includes a controller 29, switching elements 11, 12, 13, and 14 each having a body diode, a motor mechanism 15, the capacitor 23, a motor current detector 25, a determiner 26, and a motor current sensing unit 24.

The controller 29, the capacitor 23, the motor mechanism 15, and the switching elements 11, 12, 13, and 14 each having the body diode, are the same as those in the respective motor-drive H-bridge drive circuits illustrated in FIGS. 1 and 5, and thus the descriptions will be omitted.

Here, in order to simplify descriptions, the operations according to the present embodiment will be described with, as an example, the operation state of the H-bridge drive circuit when the motor is in a positive rotation state.

The motor current sensing unit 24 includes a circuit that senses the current flowing into the motor. For example, a resistor is used to form the motor current sensing unit 24.

The motor current detector 25 includes a circuit that converts, into a voltage signal VI, a current signal flowing into the motor, sensed from the motor current sensing unit 24.

The determiner 26 includes an excess current determiner 27 and a MOS all-OFF determiner 28.

Figure 11:
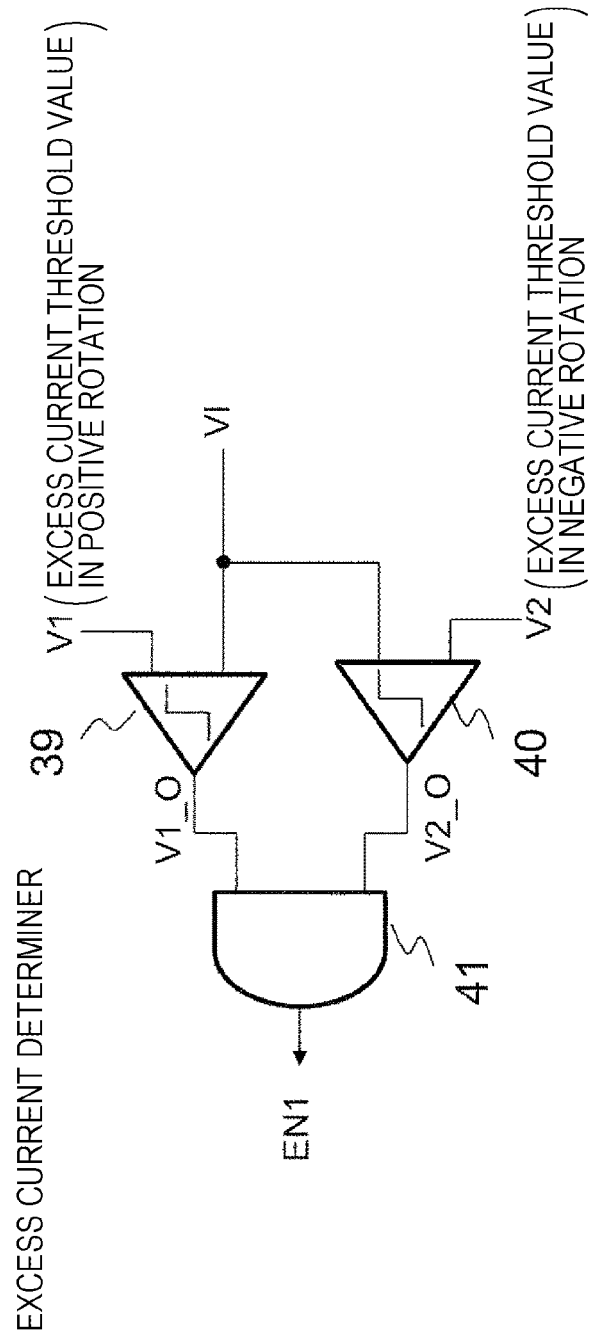
FIG. 11 illustrates an exemplary configuration of an excess current determiner according to the second embodiment.

FIG. 11 illustrates an exemplary configuration of the excess current determiner 27. The excess current determiner 27 includes two comparators 39 and 40 and a logic circuit 41, and has an excess current threshold value V1 in positive rotation and an excess current threshold value V2 in negative rotation determined. The excess current threshold value V1 in the positive rotation and the excess current threshold value V2 in the negative rotation can be adjusted with an external input 2.

Figure 12:
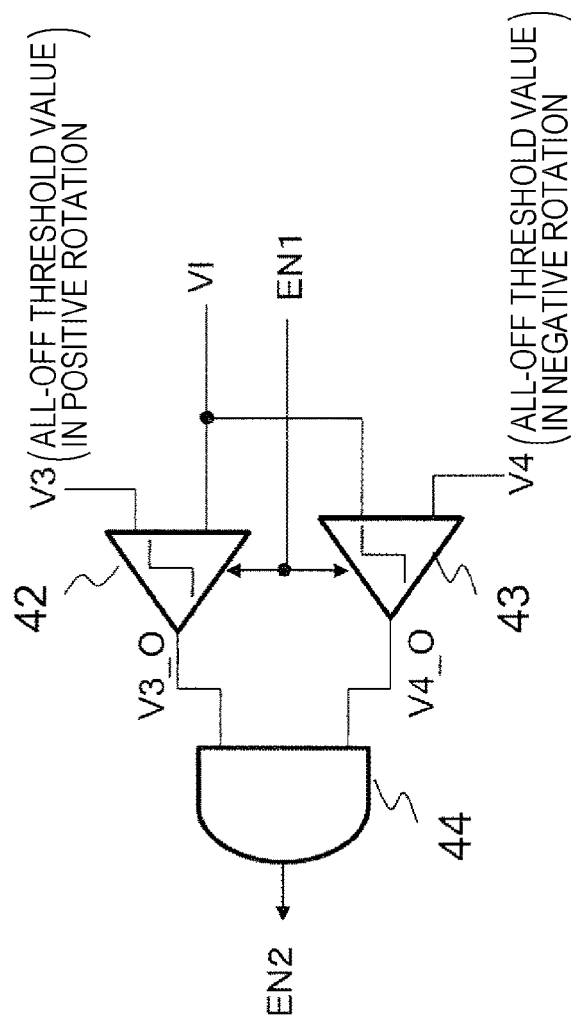
FIG. 12 illustrates an exemplary configuration of a MOS all-OFF determiner according to the second embodiment.

FIG. 12 illustrates an exemplary configuration of the MOS all-OFF determiner 28. The MOS all-OFF determiner 28 includes two comparators 42 and 43 and a logic circuit 44, and has an all-OFF threshold value V3 in the positive rotation and an all-OFF threshold value V4 in the negative rotation. The all-OFF threshold value V3 in the positive rotation and the all-OFF threshold value V4 in the negative rotation can be adjusted with an external input 1. The operation start of the MOS all-OFF determiner 28 is determined with an output signal EN1 from the excess current determiner 27.

Figure 13:
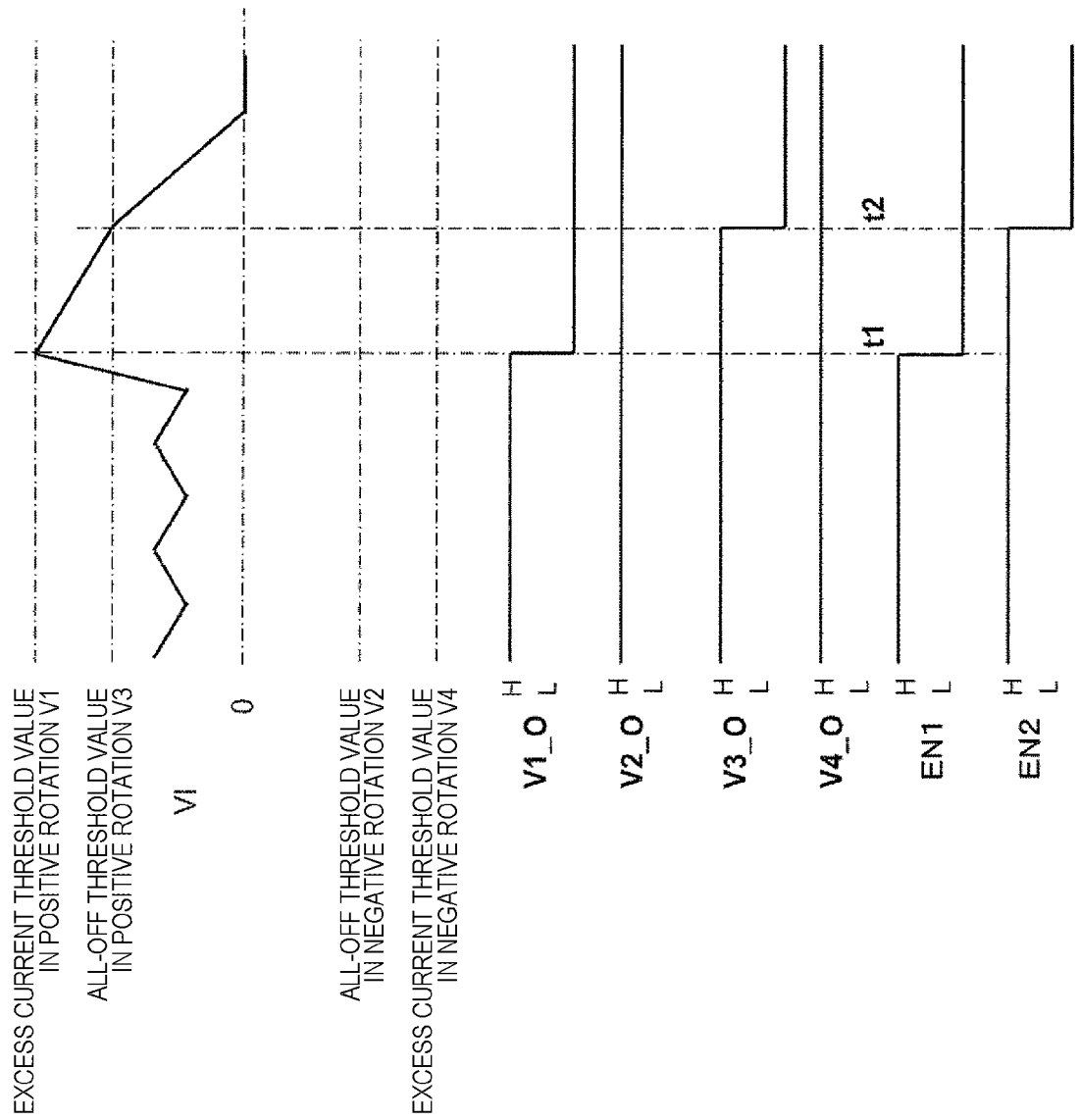
FIG. 13 is a timing chart illustrating the operations of the excess current determiner and the MOS all-OFF determiner according to the second embodiment.

FIG. 13 illustrates the operations of the excess current determiner 27 and the MOS all-OFF determiner 28.

In a case where the footer positively rotates, when the voltage signal VI from the motor current detector 25 becomes higher than the excess current determination threshold value V1 in the positive rotation in the comparator 39 of the excess current determiner 27 (the timing is defined as time t1), it is determined that the motor is in an excess current state in the positive rotation and then an output signal V1_O of the comparator 39 varies from HIGH to LOW. In this case, the voltage signal VI is not lower than the excess current determination threshold value V2 in the negative rotation in the comparator 40 of the excess current determiner 27 so that an output signal V2_O of the comparator 40 remains HIGH. Since the excess current determiner 27 outputs the logical addition of the output signals V1_O and V2_O, the output signal EN1 of the excess current determiner 27 varies from HIGH to LOW at the time t1.

When the motor positively rotates, the voltage signal VI from the motor current detector 25 is input into the MOS all-OFF determiner 28. At the time t1, when the output signal EN1 of the excess current determiner 27 varies from HIGH to LOW, the comparators 42 and 43 of the MOS all-OFF determiner 28 start operating.

When the voltage signal VI from the motor current detector 25 becomes lower than the all-OFF threshold value V3 in the positive rotation in the comparator 42 of the MOS all-OFF determiner 28 (the timing is defined as time t2), an output signal V3_O of the comparator 42 varies from HIGH to LOW. In this case, since the voltage signal VI is not higher than the all-OFF threshold value V3 in the negative rotation in the comparator 43 of the MOS all-OFF determiner 28, an output signal V4_O of the comparator 43 remains HIGH. Since the MOS all-OFF determiner 28 outputs the logical addition of the output signals V3_O and V4_O, an output signal EN2 of the MOS all-OFF determiner 28 varies from HIGH to LOW at the time t2.

Figure 14:
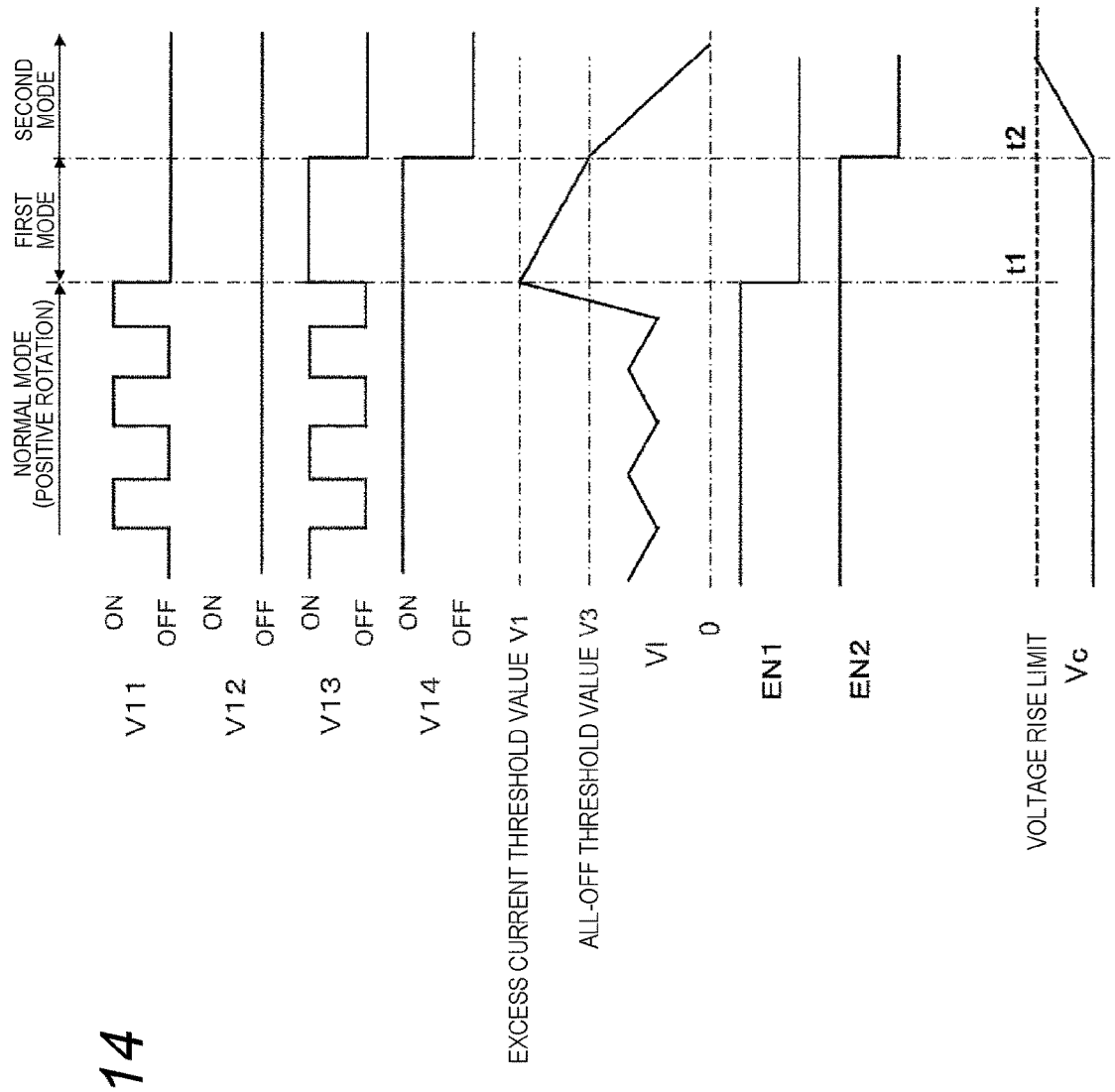
FIG. 14 is a timing chart illustrating the operation of the H-bridge drive circuit according to the second embodiment in a case where an excess current occurs when the motor positively rotates.

FIG. 14 illustrates the operation of the H-bridge drive circuit in a case where the excess current state of the motor is detected when the motor positively rotates.

When the voltage signal VI from the motor current detector 25 becomes higher than the excess current determination threshold value V1 in the positive rotation in the comparator 39 of the excess current determiner 27 (the time t1 is defined), it is determined that the motor is in the excess current state in the positive rotation and then the output signal EN1 of the excess current determiner 27 varies from HIGH to LOW. The controller 29 receives the signal EN1 so as to output respective control signals V11, V12, V13, and V14 of the switching elements 11, 12, 13, and 14 so that the switching elements 11 and 12 are controlled to be simultaneously turned OFF and the switching elements 13 and 14 are controlled to be simultaneously turned ON. The switching elements 11 and 12 may be simultaneously turned ON and the switching 13 and 14 may be simultaneously turned OFF instead. With this arrangement, the motor varies from the positive rotation state in a normal state to the positive rotation state and a mode 1 in the motor excess current.

At the time t1, when the output signal EN1 of the excess current determiner 27 varies from HIGH to LOW, the MOS all-OFF determiner 28 starts operating. As time passes from the time t1, the value of a motor current falls. When the voltage signal VI from the motor current detector 25 becomes lower than the all-OFF threshold value V3 in the positive rotation in the comparator 42 of the MOS all-OFF determiner 28 (the timing is defined at the time t2), the output signal EN2 of the MOS all-OFF determiner 28 varies from HIGH to LOW.

During the time between the time t1 and the time t2, the motor is in the positive rotation state and in the first mode after the motor excess current has occurred. Therefore, energy stored in a coil in the motor is consumed by the switching elements 13 and 14 and the resistance component in the motor so that the value of the motor current falls. In this case, the energy stored in the coil in the motor is not discharged to the capacitor 23 so that the voltage across the capacitor 23 does not rise.

At the time t2, when the output signal EN2 of the MOS all-OFF determiner 28 varies from. HIGH to LOW, the controller 29 generates control signals V11, V12, V13, and V14 to turn the switching elements 11, 12, 13, and 14 all-OFF, respectively. Therefore, a switch is made from the mode 1 to the mode 2 at the time t2. The energy stored in the coil in the motor is discharged to the power source side through the body diodes connected in parallel to the switching elements 12 and 13 so that the value of the motor current falls. The energy stored in the coil in the motor is absorbed by the capacitor 23 so that the voltage of the capacitor 23 rises.

At the time t1, when the output signal EN1 of the excess current determiner 27 varies from HIGH to LOW, the motor may vary from the normal state and the positive rotation state to the positive rotation state and the second mode accompanied with detection of the motor excess current. After that, at the time t2, when the output signal EN2 of the MOS all-OFF determiner 28 varies from HIGH to LOW, the motor may vary to the positive rotation state and the first mode 1.

According to the present embodiment, the following effect is acquired in comparison to the conventional method 1 or the conventional method 2.

In a case where a control mode is the first mode 1 after the motor excess current is detected, part of the energy stored in the coil component of the motor 15 is consumed by the switching elements 13 and 14 (or the switching elements 11 and 12). Therefore, the temperatures (the chip temperatures) of the switching elements 13 and 14 (of the switching elements 11 and 12) rise. However, since the part of the energy stored in the coil component of the motor 15 is consumed, the rise amounts of the temperatures (the chip temperatures) of the switching elements 13 and 14 (or the switching elements 11 and 12) can be smaller than those in a case where predetermined control is performed with the conventional method 2 independently.

Since the remains of the energy stored in the coil component of the motor 15 are discharged to the capacitor 23 after the switch is made from the first mode to the second mode, a voltage value applied to each of the switching elements 11 and 12 and a voltage value Vc applied to the capacitor 23 rise. However, since the part of the energy stored in the coil component of the motor 15 has already been consumed by the switching elements 13 and 14 (or the switching elements 11 and 12) in the first mode, the voltage rise values of the switching elements 11 and 12 and the capacitor 23 in the second mode are smaller than those in the conventional method 1.

Therefore, even when the capacitor 23 having capacitance smaller than that of the capacitor 17 in the conventional method 1 is used, the voltage rises of the capacitor 23 and the switching elements 11 and 12 can be inhibited within a specification range. The rises of the temperatures (the chip temperatures) of the switching elements 13 and 14 (or the switching elements 11 and 12) can be inhibited within the specification range even in an element heat dissipation condition (e.g., a case where no heat sinks for cooling the elements are provided) severer than the heat dissipation condition of the conventional method 2.

Therefore, the H-bridge circuit can be prevented from destroying, and miniaturization of the circuit device can be achieved.

The switching point from the mode 1 to the mode 2, is preferably set to the point in time when the voltage signal VI including a voltage value converted from the current value flowing into the motor 15 by the motor current detector 25, becomes the MOS all-OFF threshold value V3 (or V4) after the excess current is detected. The MOS all-OFF threshold value V3 (or the MOS all-OFF threshold value V4) is required to be set to inhibit the voltage across the capacitor 23 from exceeding the voltage V7 described in the first embodiment with the current (Is) flowing into the motor 15 when the voltage value of the voltage signal VI becomes the voltage value (V3 or V4). That is, the value of the voltage V7 is required to be set to a voltage value that does not exceed the respective withstand voltage values of the switching elements 11, 12, 13, and 14 of the H-bridge circuit. The relationship between the current (Is) flowing into the motor 15 and the voltage V7 when the MOS all-OFF threshold value V3 (or V4) is reached, is determined by the following Mathematical Formula 3.

$$Is = \sqrt{\frac{CVB^2 - CV7^2}{L}}$$ [Mathematical Formula 3]

Note that L (H) represents the inductor component of the motor and VB (V) represents the voltage of a battery. C (F) represents the capacitance value of the capacitor 23.

Only the voltage value V7 is required at least to be preset as the above in order to achieve only the inhibition of the voltage rises of the capacitor 23 and the switching elements 11 and 12 within the specification range. However, in order to inhibit the temperature rises within the predetermined range, the capacitance value C (unit: F) of the capacitor 23 is further required to be determined to the predetermined value on the basis of the formulae described in the first embodiment.

Third Embodiment

For the second embodiment, the motor current is required to be measured and the motor current sensing unit 24 is required to be provided for the measurement. Typically, the resistor is used to form the motor current sensing unit 24. However, with this arrangement, the loss of the electrical energy of the H-bridge drive circuit increases. The present embodiment is to improve the problem.

Figure 15:
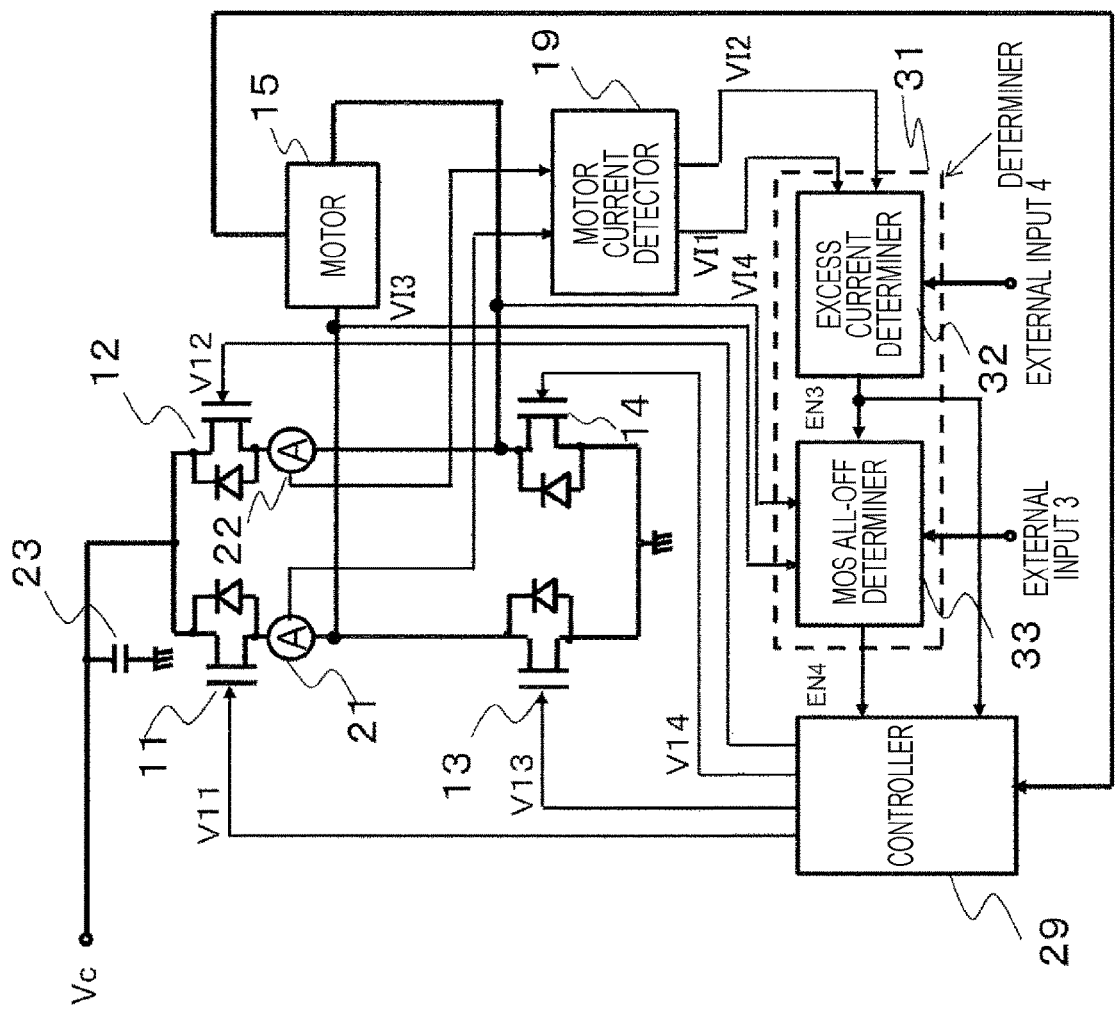
FIG. 15 illustrating a circuit configuration of a motor-drive H-bridge drive circuit according to a third embodiment.

FIG. 15 is a diagram of a configuration according to a third embodiment. The same constituent elements in FIGS. 15, 10, 5, and 1 are denoted with the same reference signs.

FIG. 15 illustrates a circuit configuration of a motor-drive H-bridge drive circuit according to the third embodiment.

The motor-drive H-bridge drive circuit according to the third embodiment, includes a controller 29, switching elements 11, 12, 13, and 14 each provided with a body diode, a motor mechanism 15, a capacitor 23, a motor current detector 19, a determiner 31, a positive-rotation motor current sensing unit 21, and a negative-rotation motor current sensing unit 22.

The controller 29, the motor current detector 19, the capacitor 23, the motor mechanism 15, the switching elements 11, 12, 13, and 14 each having the body diode, the positive-rotation motor current sensing unit 21, and the negative-rotation motor current sensing unit 22 are the same as those in the motor-drive H-bridge drive circuits illustrated in FIGS. 1, 5, and 10, and thus the descriptions will be omitted.

The determiner 31 includes an excess current determiner 32 and a MOS all-OFF determiner 33.

Figure 16:
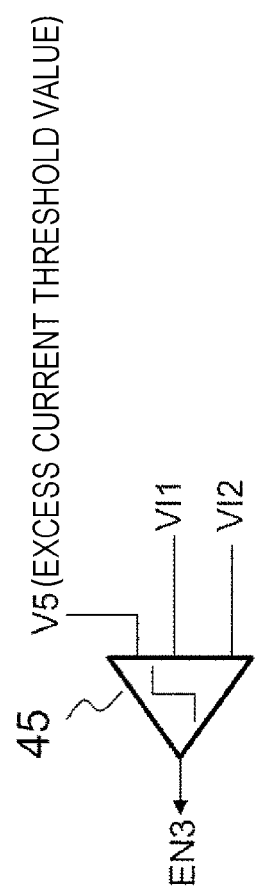
FIG. 16 illustrates an exemplary configuration of an excess current determiner according to the third embodiment.

FIG. 16 illustrates an exemplary configuration of the excess current determiner 32. The excess current determiner 32 includes a comparator 45. An excess current threshold value V5 is required to be preset. The excess current threshold value V5 can be adjusted with an external input 4.

Figure 17:
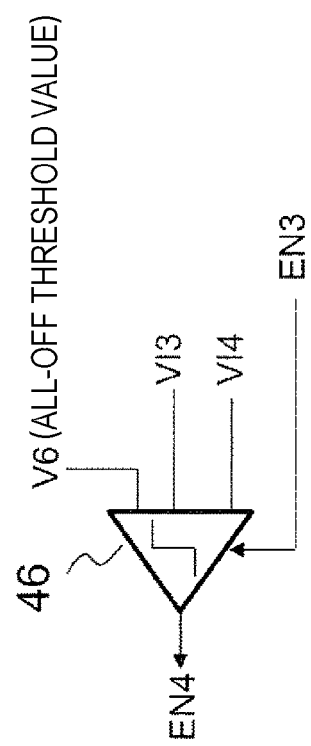
FIG. 17 illustrates an exemplary configuration of a determiner that determines the all OFF of a MOS switching element according to the third embodiment.

FIG. 17 illustrates an exemplary configuration of the MOS all-OFF determiner 33. The MOS all-OFF determiner 33 includes a comparator 46 and has an all-OFF threshold value V6 predetermined. The all-OFF threshold value V6 can be adjusted with an external input 3. The operation, start of the MOS all-OFF determiner 33 is determined with an output signal EN3 from the excess current determiner 32.

Figure 18:
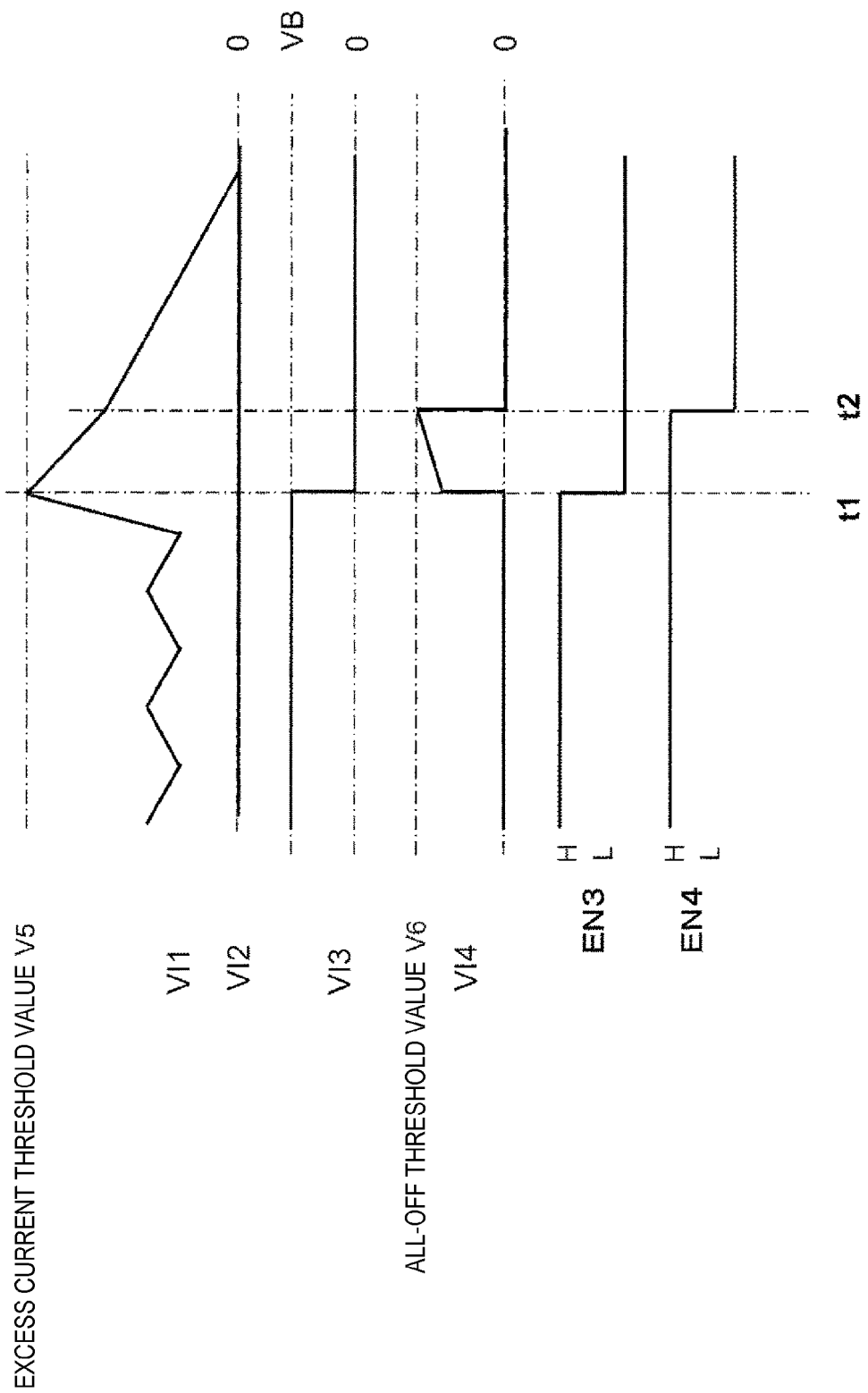
FIG 18 is a timing chart illustrating the operations of the excess current determiner and the MOS all-OFF determiner according to the third embodiment.
Figure 19:
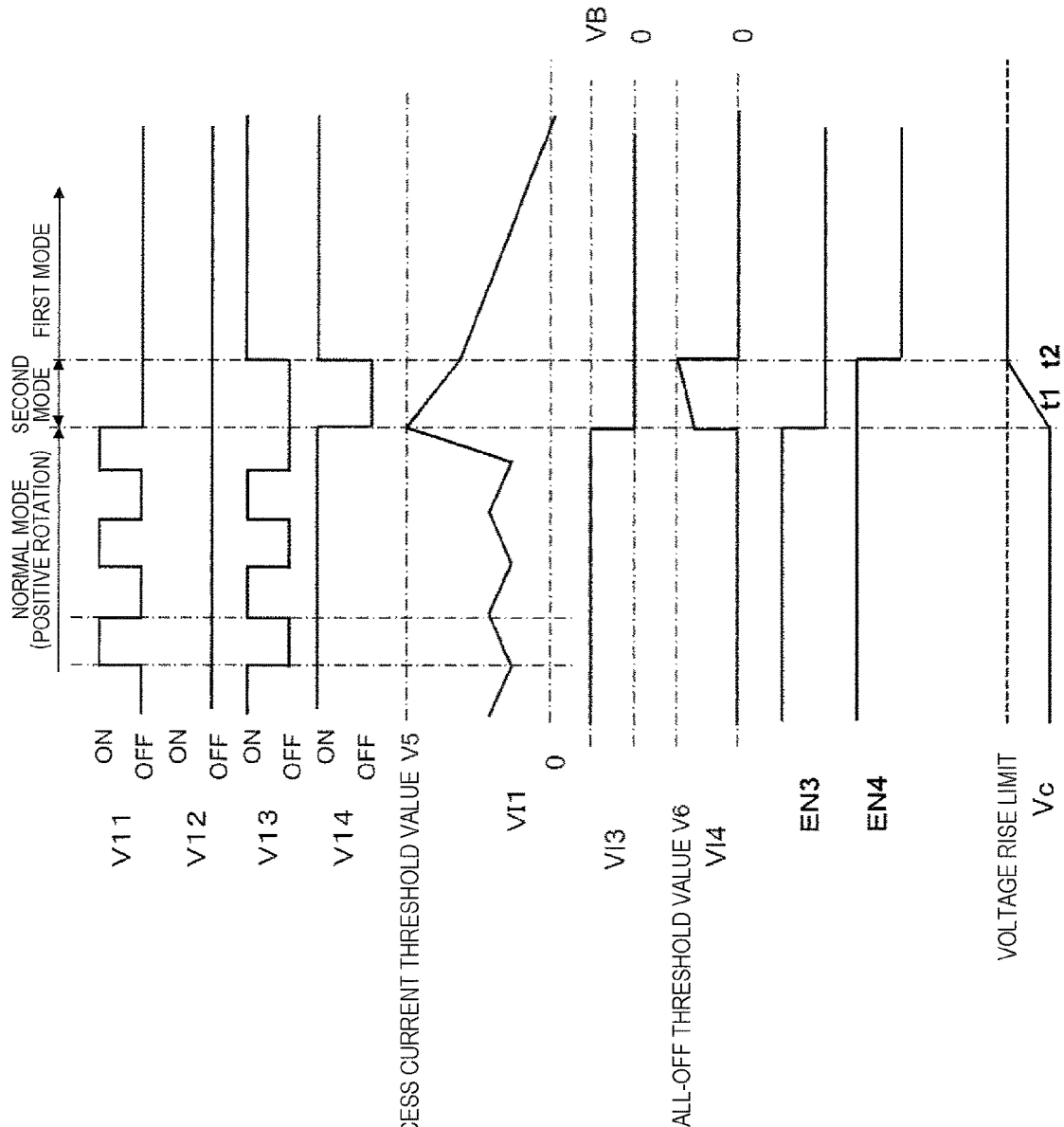
FIG. 19 is a timing chart illustrating the operation of the H-bridge drive circuit according to the third embodiment in a case where an excess current occurs when a motor positively rotates.

FIG. 18 illustrates a flow waveform chart of the operations of the excess current determiner 32 and the MOS all-OFF determiner 33. Descriptions relating to FIG. 18 will be given below. In a case where the motor positively rotates, when a voltage signal VI1 from the motor current detector 19 of FIG. 15 becomes (1) higher than the excess current threshold value V5 in the comparator 45 of the excess current determiner 32 (the time is defined as time t1), it is determined that the motor is in an excess current state and then the output signal EN3 of the comparator 45, namely, of the excess current determiner 32 varies from HIGH to LOW.

In this case, the controller 29 turns the switching elements 11, 12, 13, and 14 all-OFF so that the H-bridge drive circuit varies from a normal positive rotation mode to a second mode. With this arrangement, energy stored in a coil in the motor is discharged to the power source side through the body diodes of the switching elements 12 and 13 so that the voltage of the capacitor 23 rises. The voltage VI4 between the switching elements 12 and 14 is applied to one end of the capacitor 23 through the body diode connected in parallel to the switching element 12. Therefore, the voltage across the capacitor 23 rises until the value of the voltage VI4 becomes approximately the voltage Vc of the capacitor 23.

In this case, the value of the voltage VI3 between the switching elements 11 and 13 becomes approximately zero due to connection to the ground through the body diode connected in parallel to the switching element 13.

The voltage VI3 between the switching elements 11 and 13 and the voltage VI4 between the switching elements 12 and 14, are input to the MOS all-OFF determiner 33 (applied). At time t1, when the output signal EN3 of the excess current determiner 32 varies from HIGH to LOW, the comparator 46 of the MOS all-OFF determiner 33 starts operating.

As is clear in the above description, at the time t1, the H-bridge drive circuit varies from the normal positive rotation mode to the second mode so that the value of the voltage VI4 between the switching elements 12 and 14 rises. When the value of the voltage VI4 between the switching elements 12 and 14 becomes higher than the all-OFF threshold value V6 in the comparator 46 of the MOS all-OFF determiner 33 (the time is defined as time t2), an output signal EN4 of the comparator 46, namely, of the MOS all-OFF determiner 33 varies from HIGH to LOW. In this case, the controller 29 controls the switching elements 11 and 12 to be simultaneously turned OFF and the switching elements 13 and 14 to be simultaneously turned ON. The switching elements 11 and 12 may be controlled to be simultaneously turned ON and the switching elements 13 and 14 may be controlled to be simultaneously turned OFF.

FIG. 14 illustrates the operation of the H-bridge drive circuit when an excess current is detected in a case where the motor positively rotates.

In a case where the motor positively rotates, when the voltage signal VI1 from the motor current detector 19 becomes higher than the excess current threshold value V5 in the comparator 45 of the excess current determiner 32 (the time is defined as the time t1), it is determined that the motor is in the excess current state in the positive rotation and then the output signal EN3 of the excess current determiner 32 varies from HIGH to LOW.

The signal EN3 is input into the controller 29, and the controller 29 controls, at the time t1, the switching elements 11, 12, 13, and 14 to be simultaneously turned OFF. With this arrangement, the motor transitions from the normal state and the positive rotation state to the positive rotation state and the second mode.

In this case, the energy stored in the coil in the motor is discharged to the power source side through the body diodes connected in parallel to the switching elements 12 and 13. With this arrangement, the voltage of the capacitor 23 rises so that the value of the voltage VI4 between the switching elements 12 and 14 rises.

At the time t1, when the output signal EN3 of the excess current determiner 32 varies from HIGH to LOW, the MOS all-OFF determiner 33 stars operating.

When the voltage VI4 between the switching elements 12 and 14 gradually rises after the time t1 and then the value of the voltage VI4 becomes higher than the all-OFF threshold value V6 in the comparator 46 of the MOS all-OFF determiner 33 (the time is defined as the time t2), the output signal EN4 of the MOS all-OFF determiner 33 varies from HIGH to LOW. In this case, the controller 29 controls the switching elements 11 and 12 to be simultaneously turned OFF and the switching 13 and 14 to be simultaneously turned ON. The switching elements 11 and 12 may be simultaneously turned ON and the switching 13 and 14 may be simultaneously turned OFF instead.

With this arrangement, the motor transitions from the positive rotation state and the second mode to the positive rotation state and a first mode. With this arrangement, the energy stored in the coil in the motor is consumed by the switching elements 13 and 14 and the resistance component in the motor so that the value of a motor current falls. In this case, the energy stored in the coil in the motor is not discharged to the capacitor 23 so that the voltage of the capacitor 23 does not rise.

The following effect is acquired according to the present embodiment with the above operation, in comparison to the conventional methods 1 and 2.

When, first, the transition is made to the second mode at the point in time when the excess current of the motor 15 is detected, part of the energy stored in the coil component of the motor 15 is only discharged to the capacitor 23. Therefore, the respective voltage values applied to the switching elements 11 and 12 and the voltage Vc applied to the capacitor 23 rise together. However, after that, the transition is made from the second mode to the first mode so that the degree of the rise of the voltage value of each of the switching elements 11 and 12 and the degree of the rise of the voltage value of the capacitor 23 are lower than those in the conventional method 1.

After the switch is made from the second mode to the first mode, since the remains of the energy stored in the coil component of the motor 15 are consumed by the switching elements 13 and 14 (or the switching elements 11 and 12), the temperatures (the chip temperatures) of the switching elements 13 and 14 (or the switching elements 11 and 12) rise. However, since the part, of the energy stored in the coil component of the motor 15 has already been stored in the capacitor 23 due to the second mode, the degrees of the temperature rises of the temperatures (the chip temperatures) of the switching elements 13 and 14 (or the switching elements 11 and 12) are lower than those in the conventional method 2.

Therefore, even when the capacitor 23 having capacitance smaller than that of the capacitor 17 in the conventional method 1 is used, the voltage rises of the capacitor 23 and the switching elements 11 and 12 can be inhibited within a required specification range. The rises of the temperatures (the chip temperatures) of the switching elements 13 and 14 (or the switching elements 11 and 12) can be inhibited within the predetermined specification range even in a condition (e.g., a case where no heat sinks for cooling the elements are provided) severer than the heat dissipation condition of the conventional method 2.

Therefore, the H-bridge circuit can be prevented from destroying, and miniaturization of the circuit device can be achieved.

The switching point from the second mode to the first mode, is the point in time when the voltage VI4 (or VI3) between the switching elements 12 and 14 becomes the voltage V6. The voltage V6 is the sum of the voltage V7 of the capacitor 23 and the value of a voltage drop caused by the body diode connected in parallel to the switching element 12 (or the switching element 11). The value of the voltage V7 is set to a voltage value that does not exceed the withstand voltages of the switching elements 11, 12, 13, and 14 in the H-bridge circuit.

Only the voltage V7 is required at least to be preset in order to achieve only the inhibition of the voltage rises of the capacitor 23 and the switching elements 11 and 12 within the predetermined specification range. However, the capacitance value C (F) of the capacitor 23 is required to be determined with the calculation described in the first embodiment in order to inhibit the temperature rises within the predetermine specification range.

Fourth Embodiment

For each of the first to third embodiments, the voltage values and the current values of the predetermined portions in the H-bridge drive circuit are required to be measured. Therefore, the addition of a circuit is required in comparison to the conventional H-bridge drive circuit. Exemplary avoidance of the addition of the circuit will be described according to a fourth embodiment.

Figure 20:
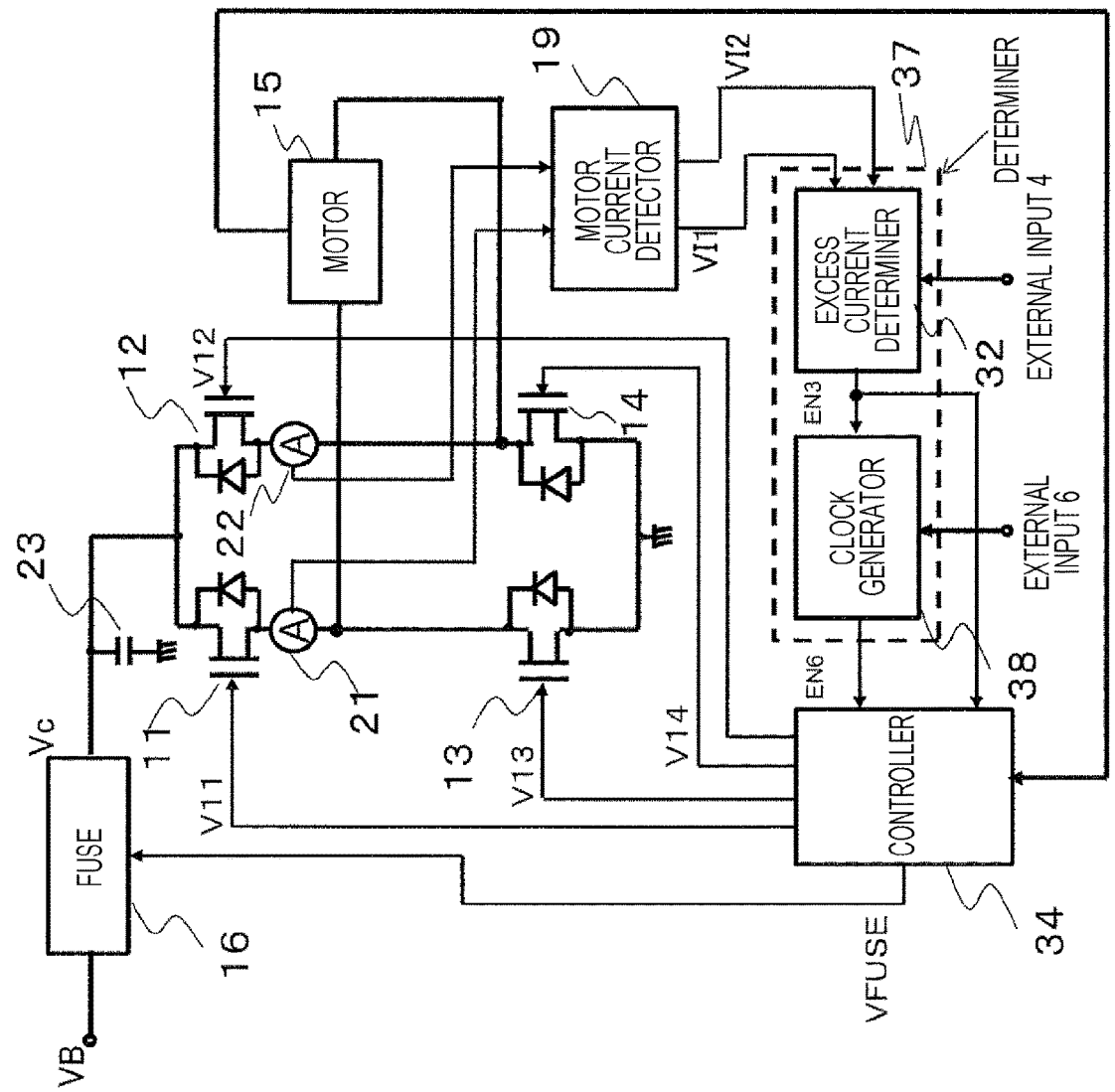
FIG. 20 illustrates a circuit configuration of a motor-drive H-bridge drive circuit according to a fourth embodiment.

FIG. 20 is a diagram of a configuration according to the fourth embodiment. In FIG. 20, constituent elements the same as the constituent elements illustrated in FIGS. 1, 5, 10, and 15 are denoted with the same reference signs.

FIG. 20 illustrates a circuit configuration of a motor-drive H-bridge drive circuit according to the fourth embodiment.

The motor-drive H-bridge drive circuit according to the fourth embodiment, includes a controller 34, switching elements 11, 12, 13, and 14 each having a body diode, a motor mechanism 15, a capacitor 23, a motor current detector 19, a determiner 37, a positive-rotation motor current sensing unit 21, and a negative-rotation motor current sensing unit 22.

The motor current detector 19, the capacitor 23, a fuse 16, the motor mechanism 15, the switching elements 11, 12, 13, and 14 each having the body diode, the positive-rotation motor current sensing unit 21, the negative-rotation motor current sensing unit 22, and an excess current determiner 32 are the same as those in the conventional motor-drive H-bridge drive circuits illustrated in FIGS. 1, 5, 10, and 15, and thus the descriptions will be omitted.

The determiner 37 includes the excess current determiner 32 and a clock generator 38.

Figure 21:
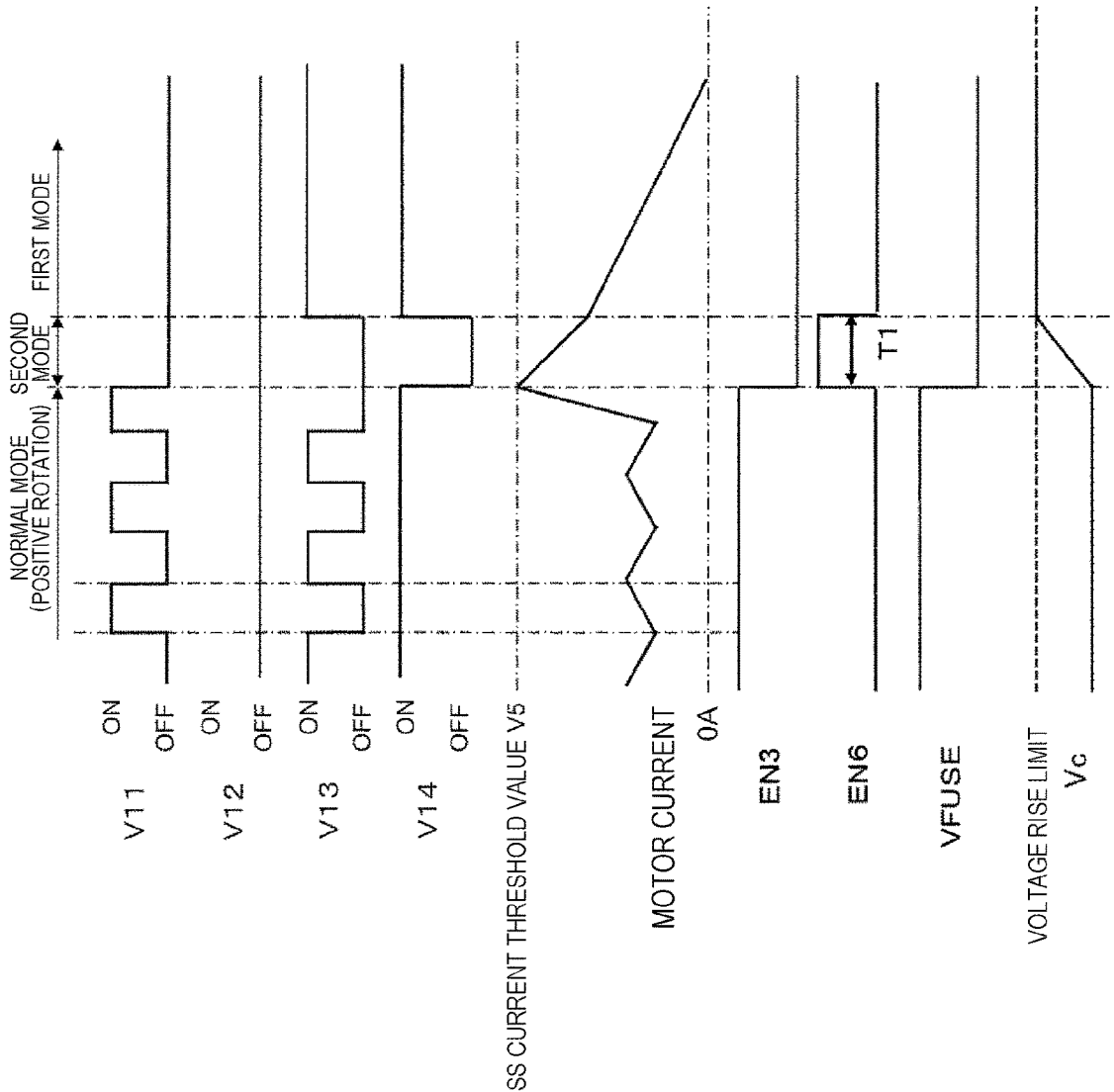
FIG. 21 is a timing chart illustrating the operations of an excess current determiner, a MOS all-OFF determiner, and a controller according to the fourth embodiment.

FIG. 21 illustrates the operations of the excess current determiner 32, the clock generator 38, and the controller 34.

When a voltage signal VI1 from the motor current detector 19 becomes higher than an excess current threshold value V5 in a comparator 45 of the excess current determiner 32 while a motor is positively rotating (the time is defined as time t1), it is determined that the motor is in an excess current state and then an output signal EN3 of the excess current determiner 32 varies from HIGH to LOW. The clock generator 38 starts operating at the time t1 and generates a pulse signal EN6 over a period T1 illustrated in FIG. 21. The signal is input into the controller 34 so that the switching elements 11, 12, 13, and 14 are turned all-OFF. With this arrangement, the motor varies from a normal state and the positive rotation state to the positive rotation and a second mode. With this arrangement, energy stored in a coil in the motor is discharged to the power source side through the body diodes connected in parallel to the switching elements 12 and 13. With this arrangement, the voltage across the capacitor 23 rises so that the value of the voltage VI4 between the switching elements 12 and 14 rises.

After the period T1, the output signal EN6 of the clock generator 38 transitions from HIGH to LOW and the controller 34 controls the switching elements 11 and 12 to be simultaneously turned OFF and the switching 13 and 14 to be simultaneously turned ON. The switching elements 11 and 12 may be controlled to be simultaneously turned ON and the switching 13 and 14 may be controlled to be simultaneously turned OFF instead. The motor transitions from the positive rotation state and the second mode state to the positive rotation state and a first mode 1 after a motor excess current is detected. The energy stored in the coil in the motor is consumed by the switching elements 13 and 14 and the resistance component in the motor so that the value of a motor current gradually falls. In this case, the energy stored in the coil in the motor is not supplied to the capacitor 23 so that the voltage across the capacitor 23 does not rise.

The operation of the H-bridge drive circuit according to the present embodiment is the same as that according to the third embodiment, and thus the description will be omitted.

The following effect is acquired according to the present embodiment with the above operation.

Since the transition is first made to the second mode after the motor excess current is detected, part of the energy stored in the coil component of the motor 15 is only supplied to the capacitor 23. In the second mode, the respective voltage values of the switching elements 11 and 12 and the value of a voltage Vc applied to the capacitor 23 each rise. However, after that, the transition is made to the first mode 1. Therefore, the degrees of the rises of the respective voltage values of the switching elements 11 and 12 and the voltage value across the capacitor 23, are lower than those in the conventional method 1.

After the switching is made from the second mode to the first mode, the remains of the energy stored in the coil component of the motor 15 are consumed by the switching elements 13 and 14 (or the switching elements 11 and 12) so that the temperatures (the chip temperatures) of the switching elements 13 and 14 (or the switching elements 11 and 12) rise. However, since the part of the energy stored in the coil component of the motor 15 has already been stored in the capacitor 23 with the operation of the second mode to which the transition is first made, the temperature rises of the temperatures (the chip temperatures) of the switching elements 13 and 14 (or the switching elements 11 and 12) are lower than those in the conventional method 2.

Therefore, the voltage rises of the capacitor 23 and the switching elements 11 and 12 can be inhibited within a desired specification range even when the capacitor 23 having the value of capacitance smaller than the capacitance of the capacitor 17 necessary in the control with the conventional method 1, is used. The rises of the temperatures (the chip temperatures) of the switching elements 13 and 14 (or the switching elements 11 and 12) can be inhibited within the predetermined specification range even in a condition (e.g., a case where no heat sinks for cooling the elements are provided) serverer than the heat dissipation condition of the conventional method 2.

Therefore, the H-bridge circuit can be prevented from destroying, and miniaturization can be achieved.

The switching point from the second mode to the first mode, is the period T1 during which the signal EN6 generated by the clock generator 38 is HIGH. During the period T1 illustrated, being the period during which the signal EN6 is HIGH, the value of the current flowing into the motor 15 falls and the voltage of the capacitor 23 rises by a predetermined voltage V7. The voltage V7 is set to the value of a voltage in a range in which the withstand voltages of the switching elements 11, 12, 13, and 14 in the H-bridge circuit are not exceeded.

Only the value of the voltage V7 is required at least to be preset in order to inhibit only the voltage rises of the capacitor 23 and the switching elements 11 and 12 within the predetermined specification range. However, in order to inhibit the temperature rises of the switching elements within the desired specification range, the capacitance value C (F) of the capacitor 23 is required to be predetermined on the basis of the calculation disclosed in the first embodiment.

Fifth Embodiment

Figure 22:
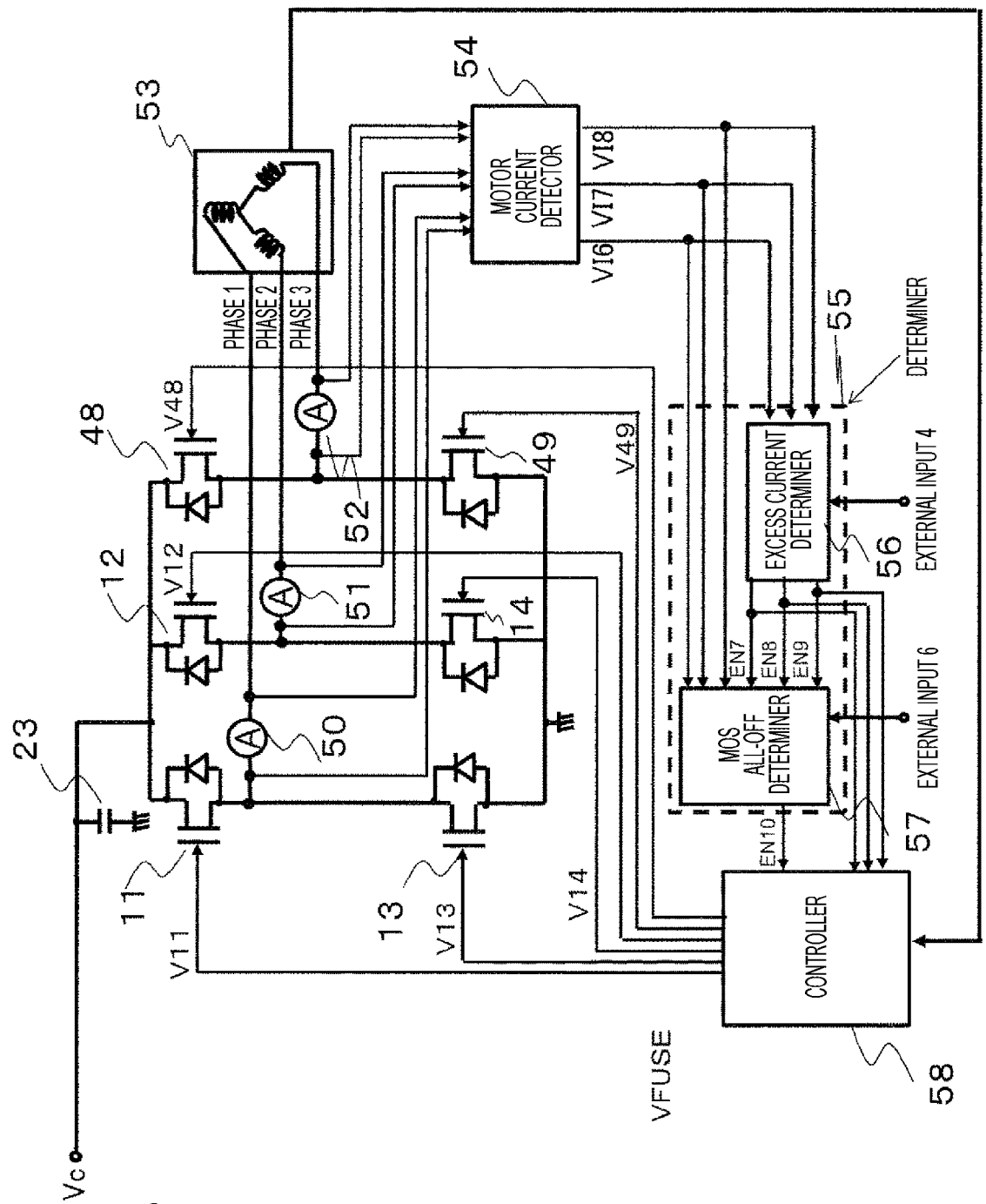
FIG. 22 illustrates a circuit configuration of a motor-drive H-bridge drive circuit according to a fifth embodiment.

According to the invention disclosed in the first to fourth embodiments, a direct current motor is premised to be used as a load. However, the present invention can be also applied to a case where a polyphase motor is used as the load. FIG. 22 illustrates an embodiment in which the invention concept described in the second embodiment is used and a three-phase motor is used as the load instead of the direct current motor. The same constituent elements in FIGS. 22, 20, 15, 10, 5, and 1 are denoted with the same reference signs.

That is FIG. 22 illustrates a circuit configuration of a motor-drive H-bridge drive circuit according to a fifth embodiment.

The motor-drive H-bridge drive circuit includes a controller 58, switching elements 11, 12, 13, 14, 48, and 49 each having a body diode, a three-phase motor mechanism 53, a capacitor 23, a motor current detector 54, a determiner 55, and motor current sensing units 50, 51, and 52.

The capacitor 23 of the figure is the same as that illustrated in FIG. 1, and thus the description will be omitted.

The type of the three-phase motor included in part of the three-phase motor mechanism 53, is not particularly limited, but here an exemplary typical 120-degree conduction-type motor will be described. A control method of such a motor includes turning the respective switching elements of the phases ON during a 120-degree period and OFF during a 60-degree period with respect to the power source side and the GND side, and thus is referred to as the 120-degree conduction type.

When the three-phase motor operates normally, the controller 58 individually controls the switching elements 11, 12, 13, 14, 48, and 49 to make a current flowing into the three-phase motor have a necessary current value, with an instruction signal from the three-phase motor mechanism 53.

When the current flowing into the three-phase motor is brought into an excess current state, the controller 58 using a signal generated with the motor current sensing units 50, 51, and 52, the motor current detector 54, and the determiner 55, generates control signals V11, V12, V13, V14, V48, and V49 for controlling the switching elements 11, 12, 13, 14, 48, and 49, respectively, so as to control the switching elements 11, 12, 13, 14, 48, and 49 with the control signals.

The motor current sensing units 50, 51, and 52 include circuits that sense currents flowing into the respective phases of the three-phase motor. For example, a resistor is used to form each of the motor current sensing units 50, 51, and 52.

The motor current detector 54 includes a circuit that converts, into voltage signals VI6, VI7, and VI8, current signals flowing into the respective phases and flowing into the motor, sensed from the motor current sensing units 50, 51, and 52.

The determiner 55 includes an excess current determiner 56 and a MOS all-OFF determiner 57.

Figure 23:
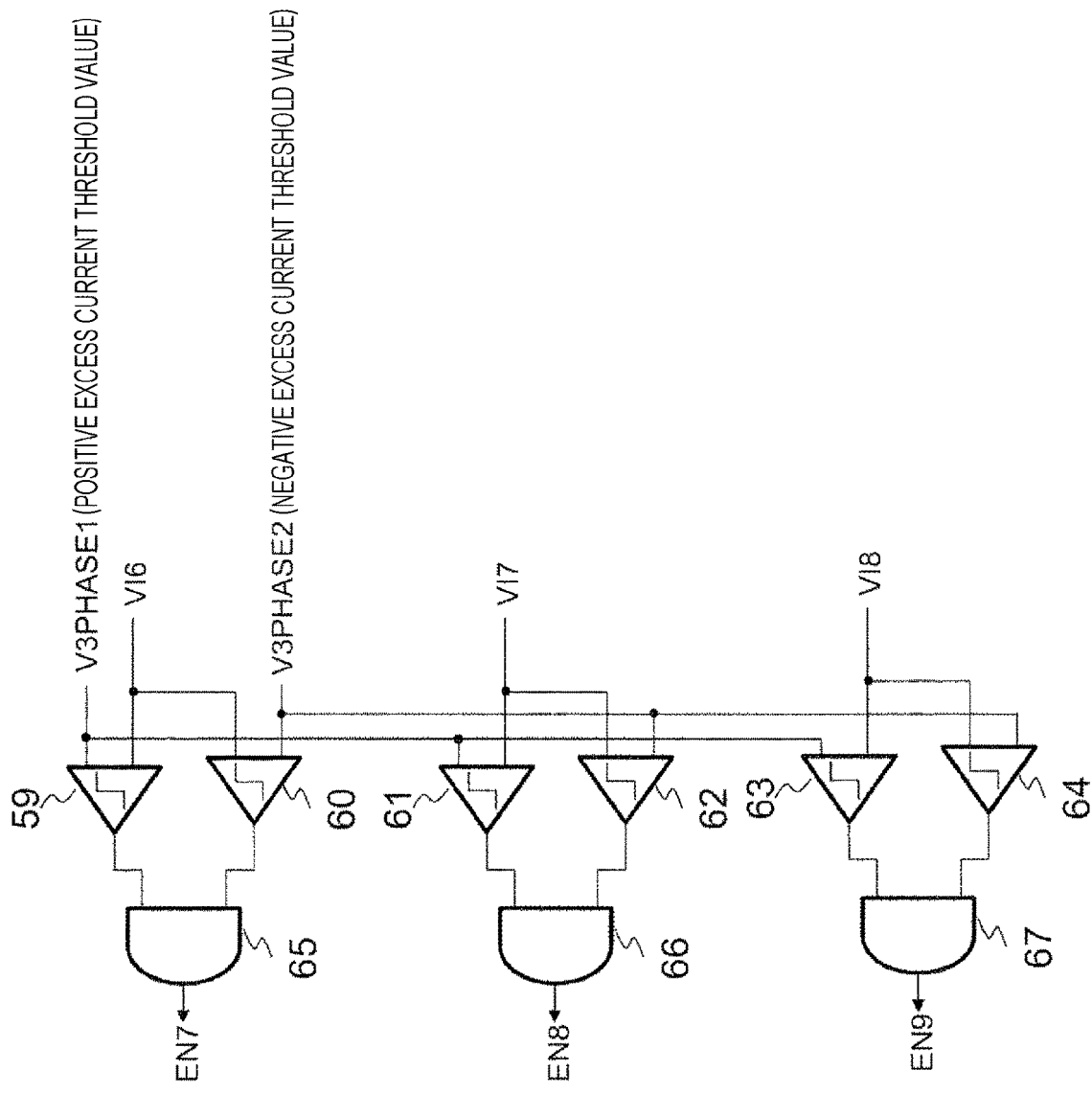
FIG. 23 illustrates an exemplary configuration of an excess current determiner according to the fifth embodiment.

FIG. 23 illustrates an exemplary configuration of the excess current determiner 56. The excess current determiner 56 includes six comparators 59, 60, 61, 62, 63, and 64 and logic circuits 65, 66, and 67, and has a positive excess current threshold value V3PHASE1 and a negative excess current threshold value V3PHASE2.

The excess current determiner 56 includes a mechanism that determines in which phase of the three phases of the three-phase motor the excess current has occurred in the three-phase motor mechanism 53. In a case where the excess current has occurred in the phase 1, the voltage signal VI6 converted from the current flowing into the phase 1, is compared to the positive excess current threshold value V3PHASE1 and the negative excess current threshold value V3PHASE2. When the predetermined positive excess current threshold value V3PHASE1 or negative excess current threshold value V3PHASE2 is reached, a signal EN7 transitions from HIGH to LOW.

Figure 24:
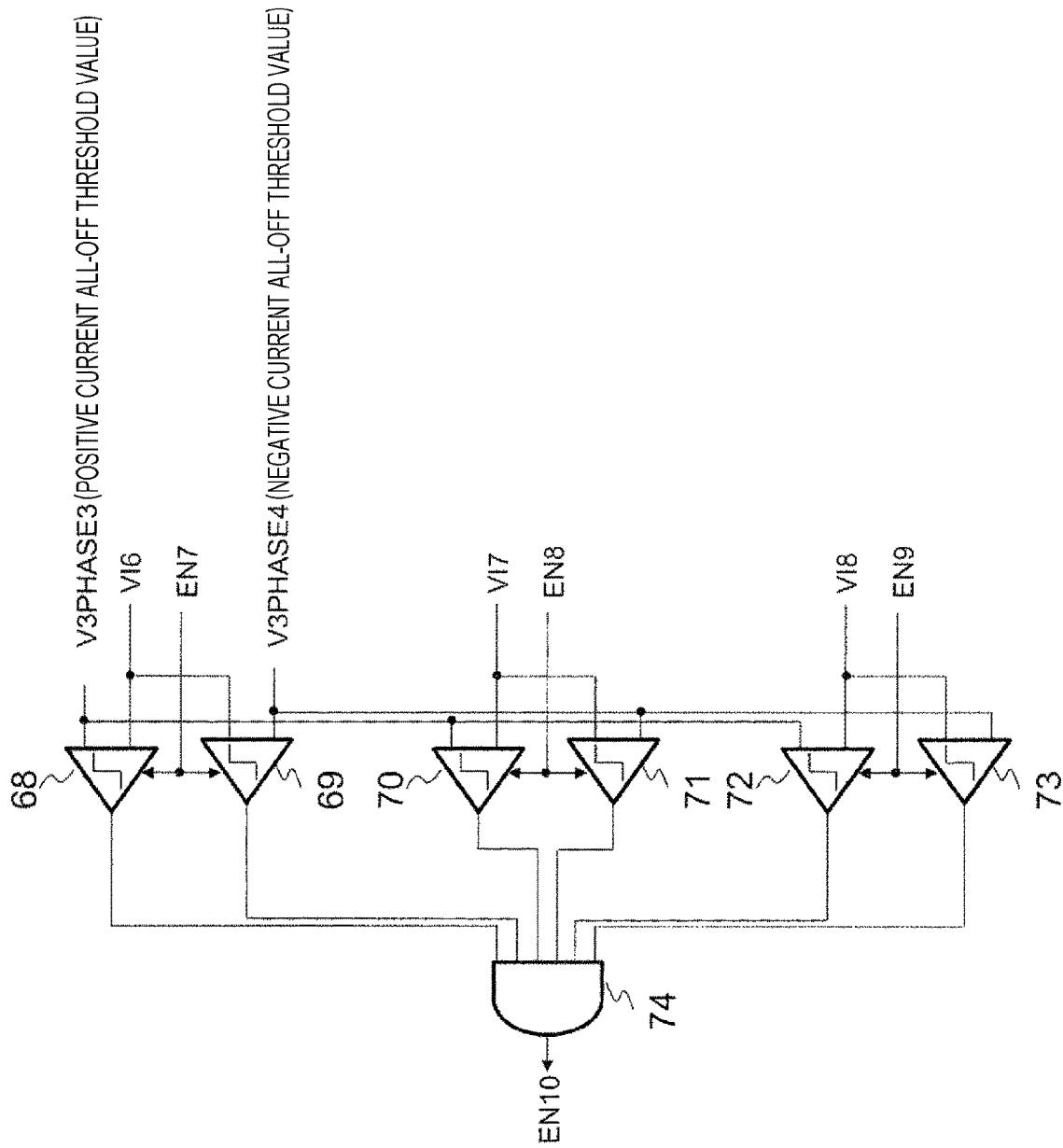
FIG. 24 illustrates an exemplary configuration of a MOS all-OFF determiner according to the fifth embodiment.

In a case where the excess current has occurred in the phase 2, the voltage signal VI7 converted from the current flowing into the phase 2, is compared to the positive excess current threshold value V3PHASE1 and the negative excess current threshold value V3PHASE2. When the predetermined positive excess current threshold value V3PHASE1 or negative excess current threshold value V3PHASE2 is reached, a signal EN8 transitions from HIGH to LOW. In a case where the excess current has occurred in the phase 3, the voltage signal VI8 converted from the current flowing into the phase 3, is compared to the positive excess current threshold value V3PHASE1 and the negative excess current threshold value V3PHASE2. When the predetermined positive excess current threshold value V3PHASE1 or negative excess current threshold, value V3PHASE2 is reached, a signal EN9 transitions from HIGH to LOW. The positive excess current threshold value V3PHASE1 and the negative excess current threshold value V3PHASE2 each can be adjusted with an external input 4. FIG. 24 illustrates an exemplary configuration of the MOS all-OFF determiner 57. The MOS all-OFF determiner 57 includes six comparators 68, 69, 70, 71, 72, and 73 and a logic circuit 74, and has a positive current all-OFF threshold value V3PHASE3 and a negative current all-OFF threshold value V3PHASE4 predetermined. The positive current all-OFF threshold value V3PHASE3 and the negative current all-OFF threshold value V3PHASE4 can be adjusted with the value of an external input signal 6.

The operation start of the MOS all-OFF determiner 57 is determined with the output signals EN7, EN8, and EN9 from the excess current determiner 56. When the output signal EN7 from the excess current determiner 56 varies to LOW, the comparators 68 and 69 start operating and compares the voltage signal VI6 converted from the current flowing into the phase 1, to the positive current all-OFF threshold value V3PHASE3 and the negative current all-OFF threshold value V3PHASE4. When the predetermined positive current all-OFF threshold value V3PHASE3 or negative current all-OFF threshold value V3PHASE4 is reached, a signal EN10 transitions form HIGH to LOW. When the output signal EN8 from the excess current determiner 56 varies to LOW, the comparators 70 and 71 start operating and compares the voltage signal VI7 converted from the current signal flowing into the phase 2, to the positive current all-OFF threshold value V3PHASE3 and the negative current all-OFF threshold value V3PHASE4. When the predetermined positive current all-OFF threshold value V3PHASE3 or negative current all-OFF threshold value V3PHASE4 is reached, the signal EN10 transitions from HIGH to LOW. When the output signal EN9 from the excess current determiner 56 varies to LOW, the comparators 72 and 73 start operating and compares the voltage signal VI8 converted from the current signal flowing into the phase 3, to the positive current all-OFF threshold value V3PHASE3 and the negative current all-OFF threshold value V3PHASE4. When the predetermined positive current all-OFF threshold value V3PHASE3 or negative current all-OFF threshold value V3PHASE4 is reached, the signal EN10 transitions from HIGH to LOW.

Figure 25:
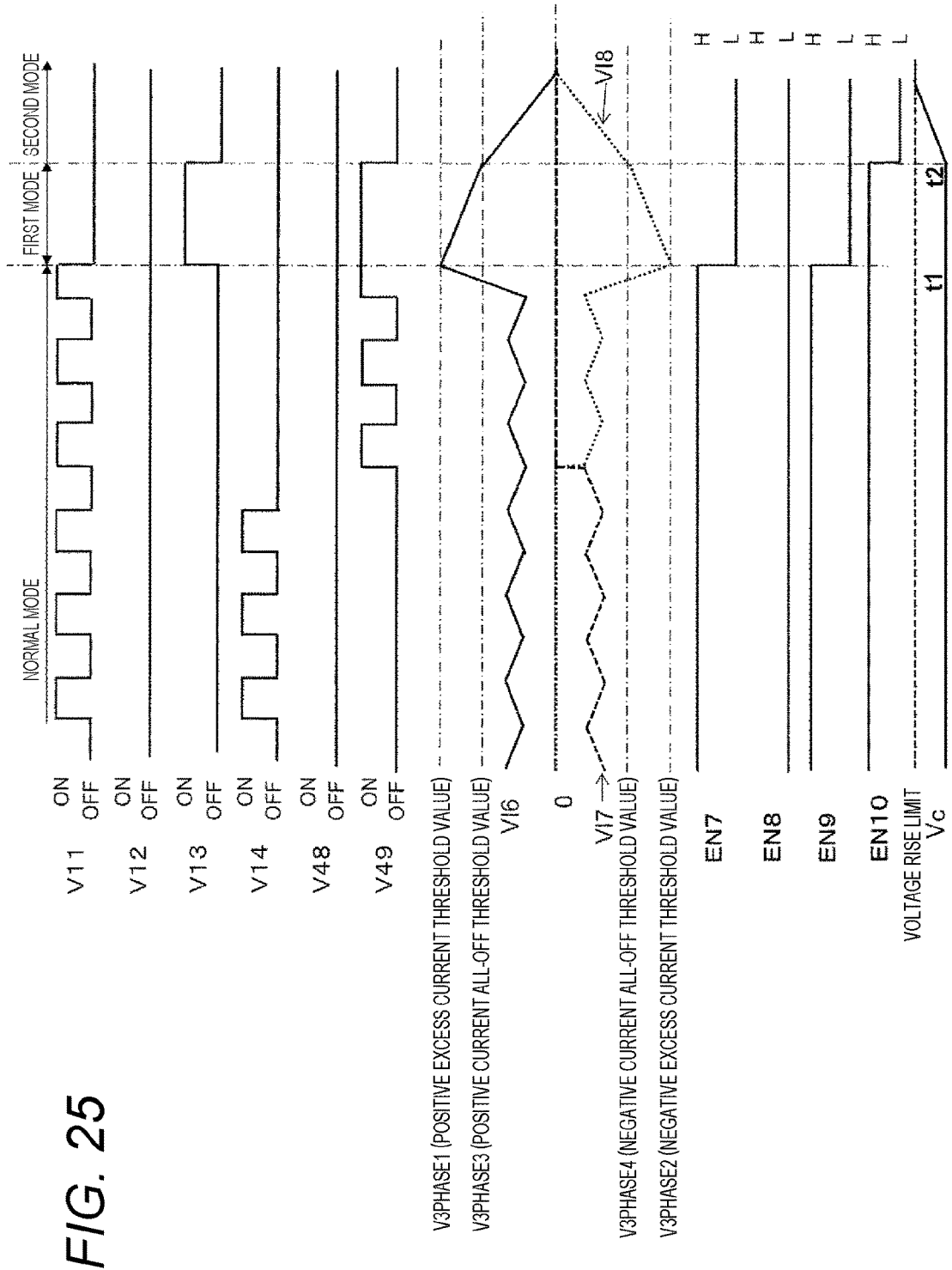
FIG. 25 is a timing chart illustrating the operation of the H-bridge drive circuit according to the fifth embodiment in a case where an excess current occurs in a phase 1 of a three-phase motor.

The operation of the H-bridge drive circuit when the excess current occurs in the phase 1 in the three-phase motor, will be exemplarily described below with FIG. 25.

When the excess current occurs in the phase 1 through V11 and V49, the signal EN7 and the signal EN9 from the excess current determiner 56 transition from HIGH to LOW on the basis of the voltage signals VI6 and VI8 in magnitude from the motor current detector 54 (time t1). In this case, the controller 58 generates the control signals V11, V12, V13, V14, V48, and V49 to simultaneously turn the switching elements 13 and 49 ON and to simultaneously turn the switching elements 11, 12, 14, and 48 OFF.

The controller 58 may generate the control signals V11, V12, V13, V14, V48, and V49 to simultaneously turn the switching elements 11 and 48 ON and to simultaneously turn the switching elements 12, 13, 14, and 49 OFF instead. With this arrangement, toe value of the current flowing into the phase 1 falls and no current is supplied to the capacitor 23 so that the voltage Vc of the capacitor 23 does not rise with the control.

When the signal EN7 transitions from HIGH to LOW, the MOS all-OFF determiner operates and compares the voltage signal VI6 converted from the current flowing into the phase 1, to the positive current all-OFF threshold value V3PHASE3 and the negative current all-OFF threshold value V3PHASE4. When the predetermined positive current all-OFF threshold value V3PHASE3 or negative current all-OFF threshold value V3PHASE4 is reached, the signal EN10 transitions from HIGH to LOW (time t2). In this case, the controller 58 generates the control signals V11, V12, V13, V14, V48, and V49 to simultaneously turn the switching elements 11, 12, 13, 14, 48, and 49 all-OFF. With this arrangement, since the current flowing into the phase 1 falls and the current flows into the capacitor 23 through the body diodes of the switching elements 11, 12, 13, 14, 48, and 49, the voltage Vc of the capacitor 23 rises.

When the output signal EN7, EN8, or EN9 of the excess current determiner 56 transitions from HIGH to LOW, the motor being the load is controlled to transition from a normal operation state to a second mode in which the switching elements 11, 12, 13, 14, 48, and 49 are simultaneously turned all-OFF. After that, when the output signal EN10 of the MOS all-OFF determiner 57 transitions from HIGH to LOW, the transition may be made from the second mode in which the switching elements 11, 12, 13, 14, 48, and 49 are simultaneously turned all-OFF to the mode in which the switching elements 11 and 48 are simultaneously turned ON and the switching elements 12, 13, 14, and 49 are simultaneously turned OFF.

Figure 26:
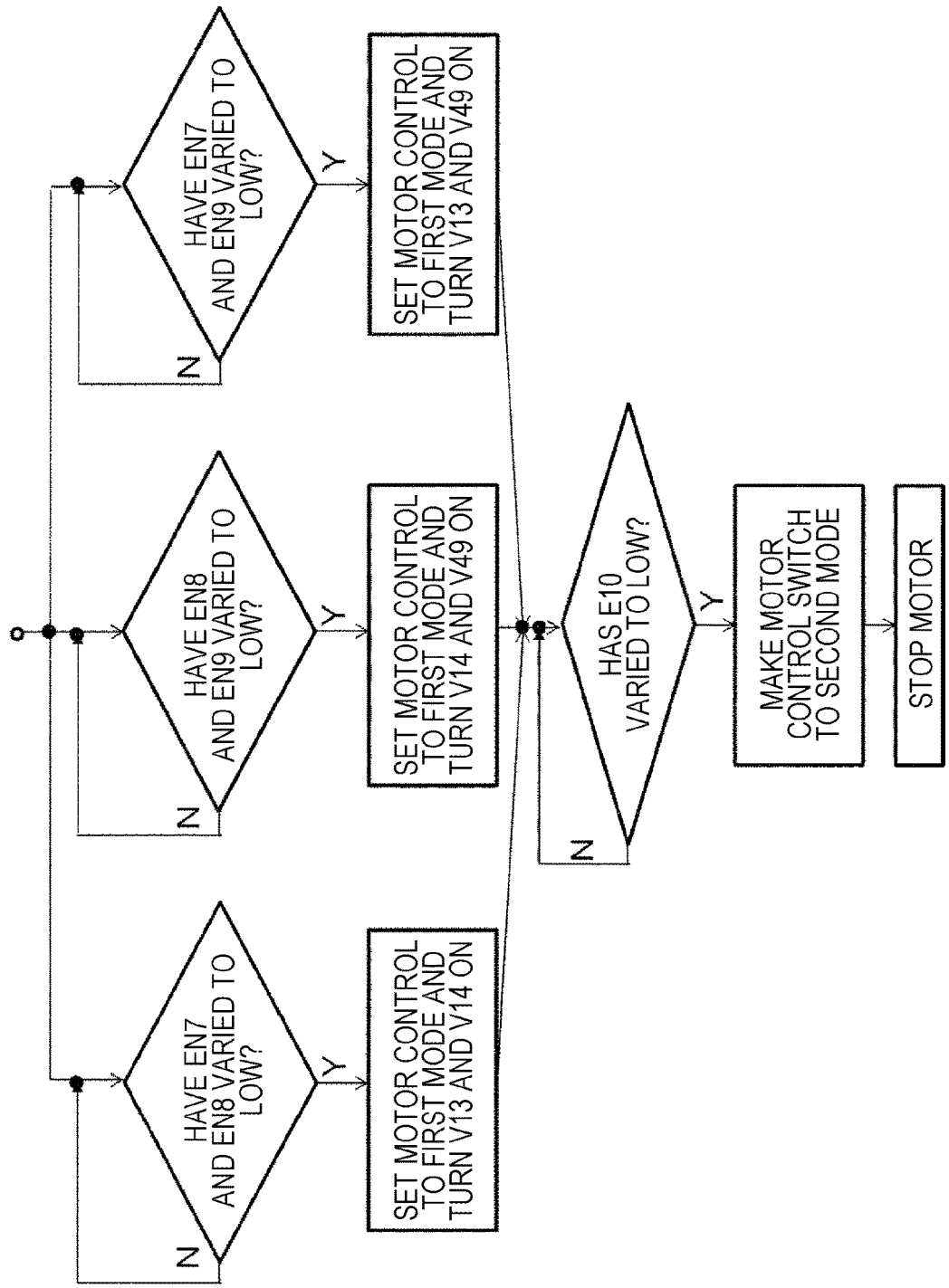
FIG. 26 is a flowchart illustrating a mode switching flow of the H-bridge drive circuit according to the fifth embodiment.

FIG. 26 is a flowchart in mode switching.

FIG. 26 will be described below.

The motor positively rotates or negatively rotates. When the motor starts operating, namely, the motor starts rotating, it is constantly monitored whether the motor is in the excess current state, namely, whether EN7, EN8, or EN9 transitions from HIGH to LOW.

In a case where no excess current state occurs, the monitoring continues.

When the excess current state is detected and EN7 and EN8 vary to LOW, the processing proceeds to the next step. Then, motor control is set to a first mode, and V13 and V14 of the MOSs are simultaneously turned ON and the other MOSs are turned OFF.

When the excess current state is detected and EN8 and EN9 vary to LOW, the processing proceeds to the next step. The motor control is set to the first mode, and V14 and V49 of the MOSs are simultaneously turned ON.

When the excess current state is detected and EN7 and EN9 vary to LOW, the processing proceeds to the next step. The motor control is set to the first mode, and V13 and V49 of the MOSs are simultaneously turned ON.

Next, a branch of whether the first mode continues or the motor control switches to the second mode, occurs on the basis of whether the signal E10 transitions from HIGH to LOW. In a case where the motor control has switched to the second mode, the control of the second operation mode still continues and the motor finally stops.

REFERENCE SIGNS LIST 11, 12, 13, 14 switching element
15 motor mechanism
16 fuse
17 capacitor
18 controller
19 motor current detector
20 excess current determiner
21 positive-rotation motor current sensing unit
22 negative-rotation motor current sensing unit
23 capacitor
24 motor current sensing unit
25 motor current detector
26 determiner
27 excess current determiner
28 MOS all-OFF determiner
29 controller
31 determiner
32 excess current determiner
33 MOS all-OFF determiner
34 controller
35 determiner
36 MOS all-OFF determiner
37 determiner
38 clock generator
39 comparator 40 comparator
41 logical addition circuit
42 comparator
43 comparator
44 logical addition
45 comparator
46 comparator
47 comparator
48, 49 switching element
50, 51, 52 motor current sensing unit
53 three-phase motor mechanism
54 motor current detector
55 determiner
56 excess current determiner
57 MOS all-OFF determiner
58 controller
59, 60, 61, 62, 63, 64 comparator
65, 66, 67 logical addition circuit
68, 69, 70, 71, 72, 73 comparator
74 logical addition circuit
I1, I2, I3, I4, I5 motor current
VFUSE control signal of fuse
VI voltage signal converted from motor current
VI1 voltage signal converted from motor current in positive rotation
VI2 voltage signal converted from motor current in negative rotation
VI3 voltage between switching element 11 and switching element 13
VI4 voltage between switching element 12 and switching element 14
VI5 voltage of capacitor
VI6 voltage signal converted from, motor current of phase 1
VI7 voltage signal converted from motor current of phase 2
VI8 voltage signal converted from motor current of phase 3
EN1 output signal of excess current determiner
EN2 output signal of MOS all-OFF determiner
EN3, EN7, EN8, EN9 output signal of excess current determiner
EN4, EN5, EN10 output signal of MOS all-OFF determiner
EN6 output signal of clock generator
VI1, VI2, VI3, VI4, V48, V49 control signal of switching element
VB power source voltage
Vc voltage of capacitor
V1 excess current threshold value in positive rotation
V2 excess current threshold value in negative rotation
V1_O output of comparator 39
V2_O output of comparator 40
V3 all-OFF threshold value in positive rotation
V4 all-OFF threshold value in negative rotation
V3_O output of comparator 42
V4_O output of comparator 43
V5 excess current threshold value
V6 all-OFF threshold value

The invention claimed is:

1. A load drive device comprising:
a first switching element, including either a first source terminal or a first drain terminal connected to a side of power source potential and either the first drain terminal or the first source terminal connected to one end terminal of a coil load;
a second switching element including either a second drain terminal or a second source terminal connected to a side of ground potential and either the second source terminal or the second drain terminal connected to either the first drain terminal of the first switching element or the second source terminal;
a third switching element including either a third source terminal or a third drain terminal connected to the side of the power source potential and either the first drain terminal or the first source terminal connected to another terminal of the load;
a fourth switching element including either a fourth drain terminal or a fourth source terminal connected to the side of the ground potential and either the fourth source terminal or the fourth drain terminal connected to either the third drain terminal or the third source terminal of the third switching element;
a capacitor including both end terminals connected between the power source potential and the ground potential;
a voltage measurement unit configured to measure a voltage across the capacitor; and
a control unit configured to individually turn the first to fourth switching elements ON or OFF,
wherein the voltage measurement unit detects whether a value of the voltage across the capacitor is not less than a predetermined voltage value set based on withstand voltage values of the first to fourth switching elements or is less than the predetermined voltage value,
the control unit performs switching control between a first mode and a second mode in an operation mode in which the first to fourth switching elements connected to the load are turned ON or OFF, or performs, after control in either the first or second mode starts, the switching control in mode into the second mode or the first mode,
the control unit operates the first to fourth switching elements in the first mode in a case where the voltage across the capacitor is not less than the predetermined voltage value, and operates the first to fourth switching elements in the second mode in a case where the voltage across the capacitor is less than the predetermined value,
the first mode is the operation mode in which all the first to fourth switching elements are turned OFF,
the second mode turns either the second or fourth switching element ON and turns all the other first to fourth switching elements OFF so as to form a closed current path including the coil load and the ground potential,
a capacitance value of the capacitor is determined based on a difference energy value between an energy value stored in the load at time at which occurrence of an excess current in the load is detected and an energy value consumed by either the second or fourth switching element with a current flowing into either the second or fourth switching element in the second mode after the detection of the excess current, and
the voltage across the capacitor is determined to a value of the predetermined voltage value or less, the voltage across the capacitor rising with electrical energy supplied, through the load and diode elements connected in parallel to the first to fourth switching in the first operation mode, to the diodes.

2. The load drive device according to claim 1, further comprising:
a current detection unit configured to detect a current flowing into the load,
wherein the current detection unit generates an excess current determination signal in a case where determining that a value of the current flowing into the load is not less than a predetermined current value with which the excess current occurs to a motor being the load, and the control unit that has received the determination signal, is configured to perform the switching control between the first mode and the second mode in the operation mode in which the first to fourth switching elements connected to the load are turned ON or OFF, or is configured to perform, after the control in either the first or second mode starts, the switching control in mode into the second mode or the first mode.

3. The load drive device according to claim 1, wherein the voltage measurement unit is configured to detect a voltage at a connecting point between the first and second switching elements and a voltage at a connecting point between the third and fourth switching elements.

4. The load drive device according to claim 1, wherein the voltage measurement unit is configured to detect a current flowing into the load.

5. The load drive device according to claim 1, wherein the predetermined voltage value and/or the predetermined current value are adjustable with a setting signal from an external device or the control unit including a microprocessor.

6. A load drive device comprising:
a first switching element including either a first source terminal or a first drain terminal connected to a side of power source potential and either the first drain terminal or the first source terminal connected to one end terminal of a coil load;
a second switching element including either a second drain terminal or a second source terminal connected to a side of ground potential and either the second source terminal or the second drain terminal connected to either the first drain terminal of the first switching element or the second source terminal;
a third switching element including either a third source terminal or a third drain terminal connected to the side of the power source potential and either the first drain terminal or the first source terminal connected to another terminal of the load;
a fourth switching element including either a fourth drain terminal or a fourth source terminal connected to the side of the ground potential and either the fourth source terminal or the fourth drain terminal connected to either the third drain terminal or the third source terminal of the third switching element;

a capacitor including both end terminals connected between the power source potential and the ground potential; and
a control unit configured to individually turn the first to fourth switching elements ON or OFF,
wherein the control unit performs switching control between a first mode and a second mode in an operation mode in which the first to fourth switching elements connected to the load are turned ON or OFF,
the control unit operates the first to fourth switching elements in the first mode when occurrence of an excess current in the load is detected, and operates the first to fourth switching elements in the second mode after a predetermined period passes from time at which the occurrence of the excess current in the load is detected,
the first mode is the operation mode in which all the first to fourth switching elements are turned OFF,
the second mode turns either the second or fourth switching element ON and turns all the other first to fourth switching elements OFF so as to form a closed current path including the coil load and the ground potential,
a capacitance value of the capacitor is determined based on a difference energy value between ah energy value stored in the load at the time at which the occurrence of the excess current in the load is defected and an energy value consumed by either the second or fourth switching element with a current flowing into either the second or fourth switching element in the second mode after the detection of the excess current, and
the voltage across the capacitor is determined to a value of the predetermined voltage value or less, the voltage across the capacitor rising with electrical energy supplied, through the load and diode elements connected in parallel to the first to fourth, switching in the first operation mode, to the diodes.

7. The load drive device according to claim 6, wherein the control unit is configured to operate the first to fourth switching elements in the second mode when a flow of the excess current into the load is detected, and is configured to operate the first to fourth switching elements in the first mode after the predetermined period passes from the time at which the flow of the excess current into the load is detected.

* * * * *